US009923632B2

(12) United States Patent
Yamauchi et al.

(10) Patent No.: US 9,923,632 B2
(45) Date of Patent: Mar. 20, 2018

(54) OPTICAL TRANSMISSION APPARATUS, OPTICAL TRANSMISSION SYSTEM, AND METHOD OF CONTROLLING OUTPUT OF OPTICAL SIGNAL

(71) Applicant: FUJITSU LIMITED, Kawasaki-shi, Kanagawa (JP)

(72) Inventors: Tomohiro Yamauchi, Kawasaki (JP); Shoichiro Oda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/410,237

(22) Filed: Jan. 19, 2017

(65) Prior Publication Data
US 2017/0214461 A1   Jul. 27, 2017

(30) Foreign Application Priority Data

Jan. 25, 2016  (JP) .................................. 2016-011560

(51) Int. Cl.
*H04B 10/00* (2013.01)
*H04B 10/079* (2013.01)
*H04J 14/02* (2006.01)
*H04B 10/50* (2013.01)
*H04B 10/564* (2013.01)

(52) U.S. Cl.
CPC ... *H04B 10/07957* (2013.01); *H04B 10/0793* (2013.01); *H04B 10/506* (2013.01); *H04B 10/564* (2013.01); *H04J 14/0221* (2013.01); *H04J 14/0227* (2013.01); *H04J 14/0257* (2013.01)

(58) Field of Classification Search
None
See application file for complete search history.

(56) References Cited

U.S. PATENT DOCUMENTS 6,634,807 B1 * 10/2003 Al-Salameh ......... H04B 10/077
                                                  398/10
6,987,922 B2 *  1/2006 Bierman .............. H04B 10/077
                                                  333/81 R (Continued)

FOREIGN PATENT DOCUMENTS

EP        2 595 334 A2     5/2013
JP        2013-106187      5/2013

(Continued)

OTHER PUBLICATIONS

EESR—Extended European Search Report dated May 26, 2017 issued with respect to the corresponding European Patent Application No. 17151366.6.

*Primary Examiner* — Agustin Bello
(74) *Attorney, Agent, or Firm* — Fujitsu Patent Center

(57) ABSTRACT

An optical transmission apparatus includes a variable attenuator configured to adjust output intensity of each wavelength signal included in a multiplexed optical signal having been input; a monitor configured to measure an output spectrum of the variable attenuator; a calculation unit configured to calculate an amount of spectral narrowing and an amount of spectral surplus, based on a measured value by the monitor, and a target value set in advance; and a control unit configured to control an amount of attenuation of the variable attenuator, based on the amount of spectral narrowing and the amount of spectral surplus.

20 Claims, 21 Drawing Sheets

(56) References Cited

U.S. PATENT DOCUMENTS

| | | | | | |
|---|---|---|---|---|---|
| 7,209,661 | B2* | 4/2007 | Mori | | H04B 10/506 398/43 |
| 7,233,432 | B2* | 6/2007 | Islam | | H04B 10/2935 359/334 |
| 7,385,754 | B2* | 6/2008 | Ghera | | H04J 14/02 359/337.1 |
| 8,306,427 | B2* | 11/2012 | Goto | | H04B 10/07955 398/26 |
| 8,331,778 | B2* | 12/2012 | Shimizu | | G01J 3/02 356/73.1 |
| 8,554,070 | B2* | 10/2013 | Ueki | | H04B 10/506 398/182 |
| 8,565,604 | B2* | 10/2013 | Koyano | | H04B 10/07955 398/34 |
| 9,094,148 | B2* | 7/2015 | Ji | | H04J 14/0221 |
| 9,628,173 | B2* | 4/2017 | Tokura | | H04B 10/032 |
| 9,667,346 | B2* | 5/2017 | Araki | | H04B 10/572 |
| 9,698,905 | B2* | 7/2017 | Saito | | H04B 10/07957 |
| 9,706,273 | B2* | 7/2017 | Haslam | | H04Q 11/0005 |
| 2001/0019438 | A1* | 9/2001 | Frignac | | H04B 10/2563 398/79 |
| 2002/0048062 | A1* | 4/2002 | Sakamoto | | H04B 10/0775 398/30 |
| 2003/0058504 | A1* | 3/2003 | Cho | | H04B 10/2543 398/147 |
| 2003/0099475 | A1* | 5/2003 | Nemoto | | H04J 14/0212 398/83 |
| 2003/0156779 | A1* | 8/2003 | Wang | | G02B 6/12021 385/15 |
| 2003/0223728 | A1* | 12/2003 | Maeda | | H04B 10/2931 385/140 |
| 2003/0223748 | A1* | 12/2003 | Stowe | | G02B 6/2931 398/48 |
| 2004/0081421 | A1* | 4/2004 | Mori | | H04B 10/506 385/140 |
| 2004/0126120 | A1* | 7/2004 | Cohen | | G02F 1/0115 398/158 |
| 2006/0222366 | A1* | 10/2006 | Sugaya | | H04B 10/296 398/79 |
| 2007/0274721 | A1* | 11/2007 | Barker | | H04B 10/079 398/66 |
| 2008/0187311 | A1* | 8/2008 | Birk | | G01M 11/33 398/43 |
| 2009/0022499 | A1* | 1/2009 | Roy | | G02B 6/4246 398/158 |
| 2009/0297143 | A1* | 12/2009 | Takeyama | | H04B 10/07955 398/34 |
| 2009/0317076 | A1* | 12/2009 | Shimizu | | G01J 3/02 398/25 |
| 2010/0158532 | A1* | 6/2010 | Goto | | H04B 10/07955 398/81 |
| 2012/0219293 | A1* | 8/2012 | Boertjes | | H04J 14/0204 398/48 |
| 2012/0230681 | A1* | 9/2012 | Ueki | | H04B 10/506 398/34 |
| 2013/0121691 | A1* | 5/2013 | Oda | | H04J 14/0221 398/34 |
| 2014/0161448 | A1* | 6/2014 | Kaburagi | | H04J 14/0204 398/48 |
| 2014/0286637 | A1* | 9/2014 | Kikuchi | | H04J 14/0212 398/48 |
| 2014/0314416 | A1 | 10/2014 | Vassilieva et al. | | |
| 2014/0334814 | A1* | 11/2014 | Ji | | H04J 14/0221 398/26 |
| 2016/0043825 | A1* | 2/2016 | Boertjes | | H04J 14/0204 398/48 |
| 2016/0204875 | A1* | 7/2016 | Araki | | H04B 10/572 398/34 |
| 2017/0214461 | A1* | 7/2017 | Yamauchi | | H04B 10/0793 |

FOREIGN PATENT DOCUMENTS

| | | |
|---|---|---|
| JP | 2013-106328 | 5/2013 |
| JP | 2014-116642 | 6/2014 |

* cited by examiner

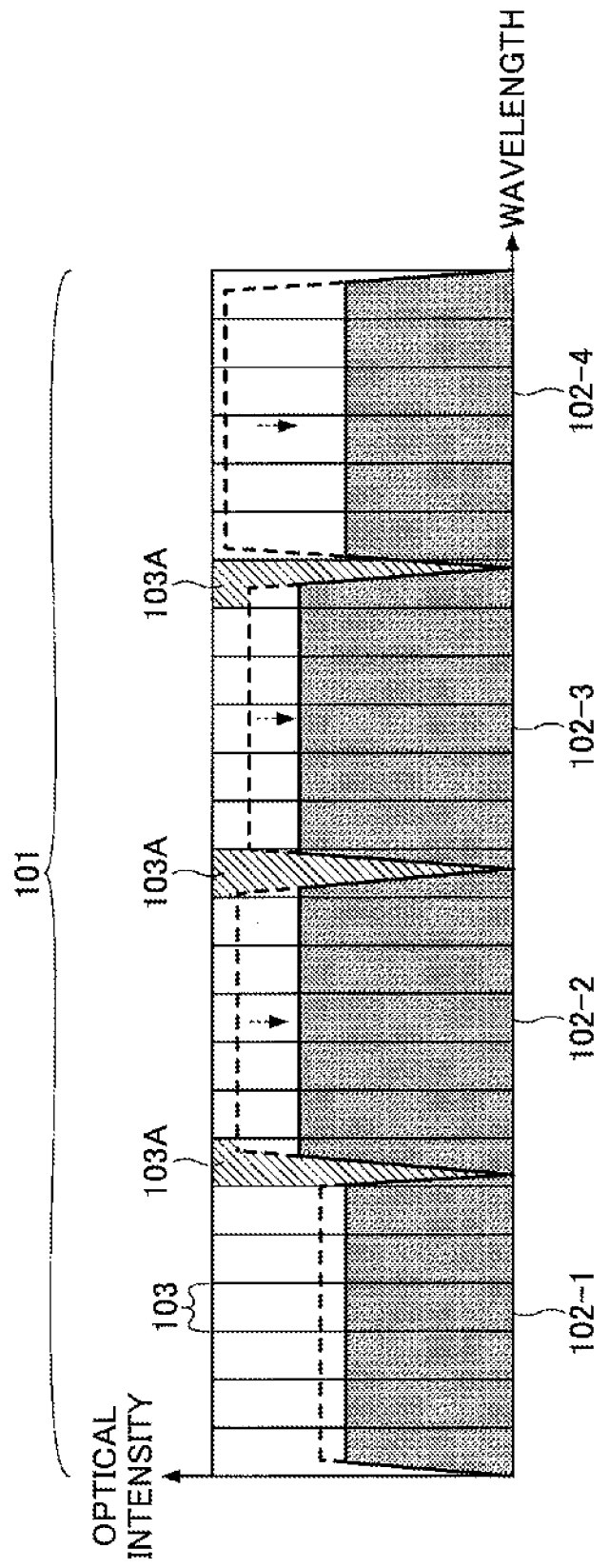

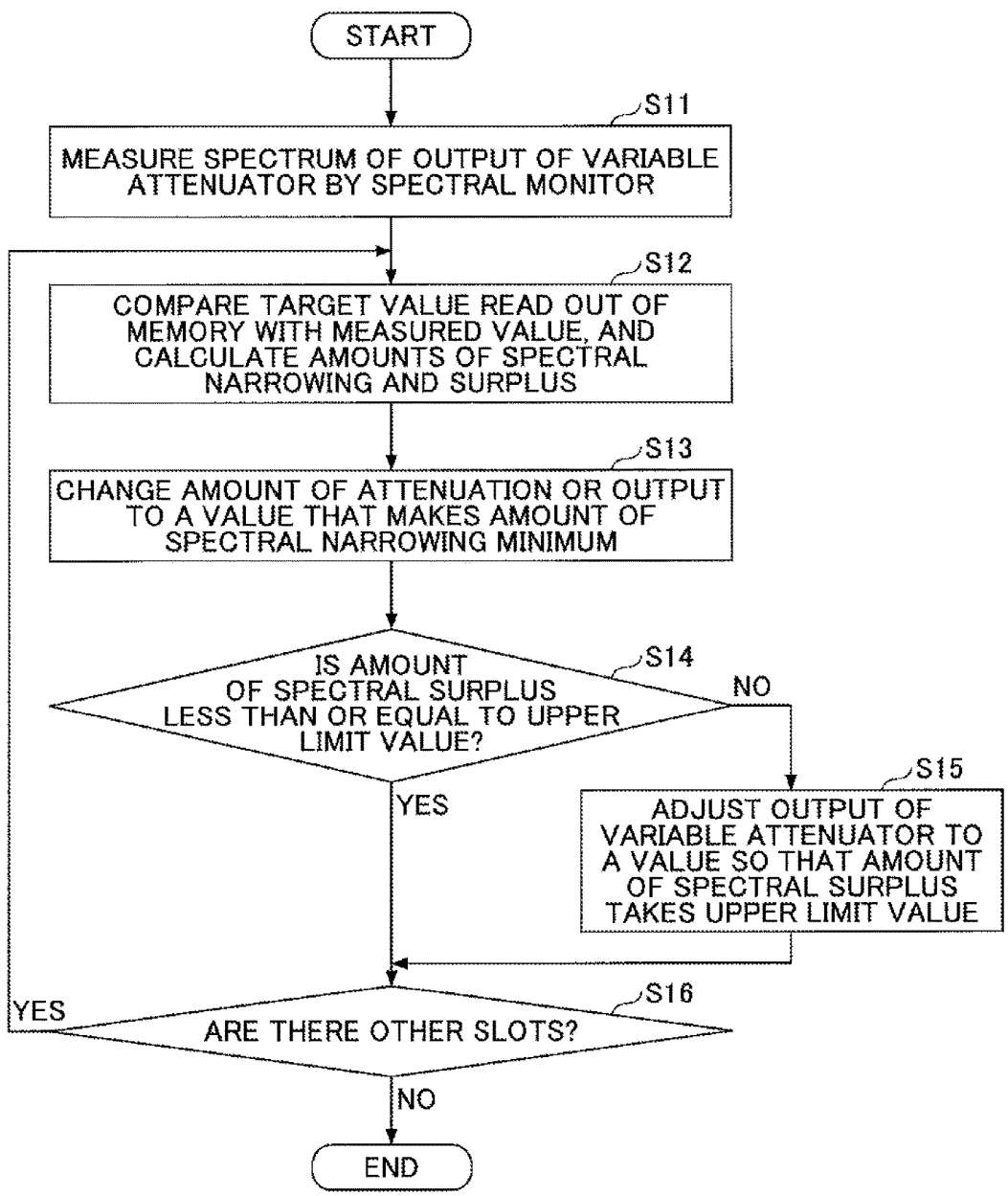

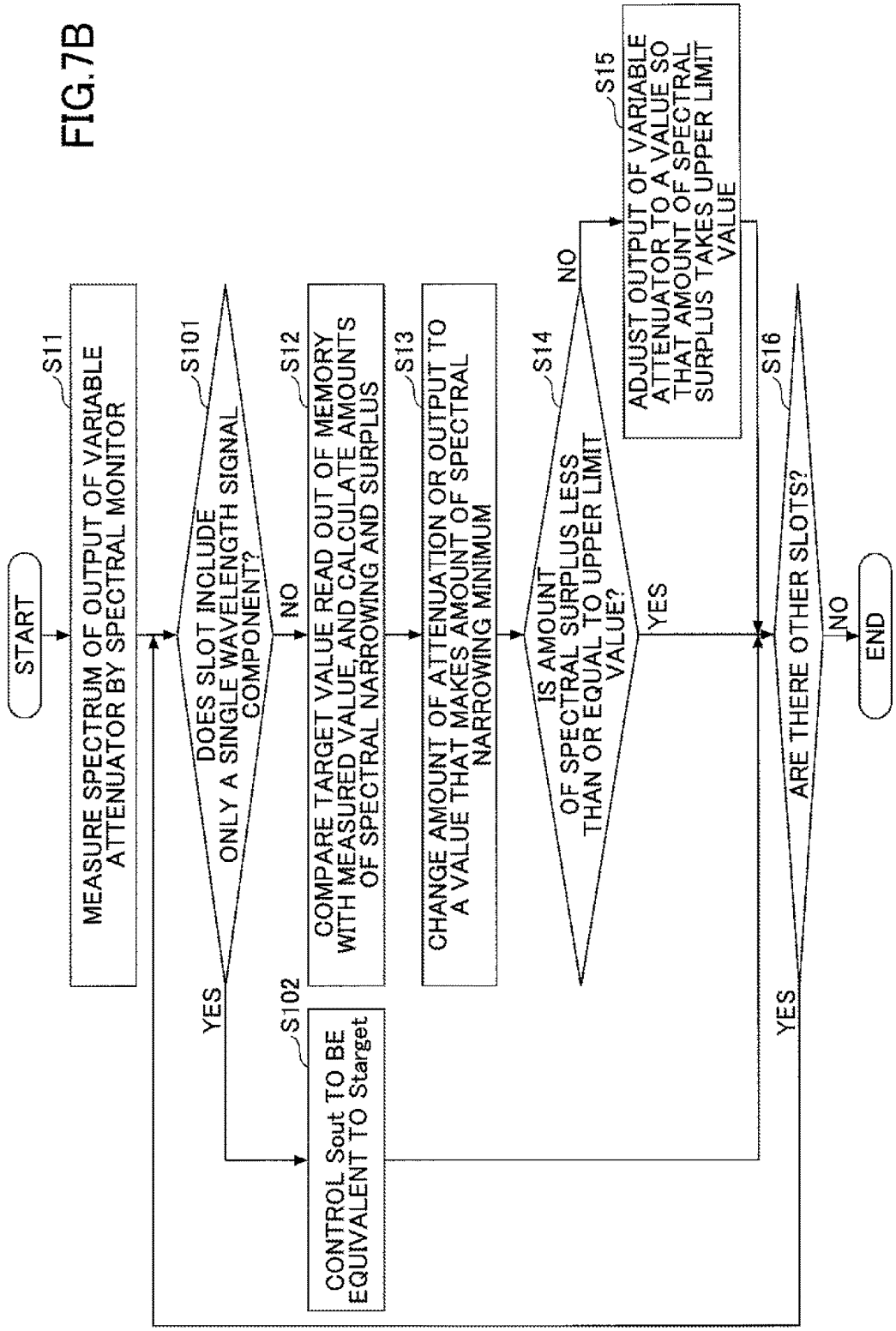

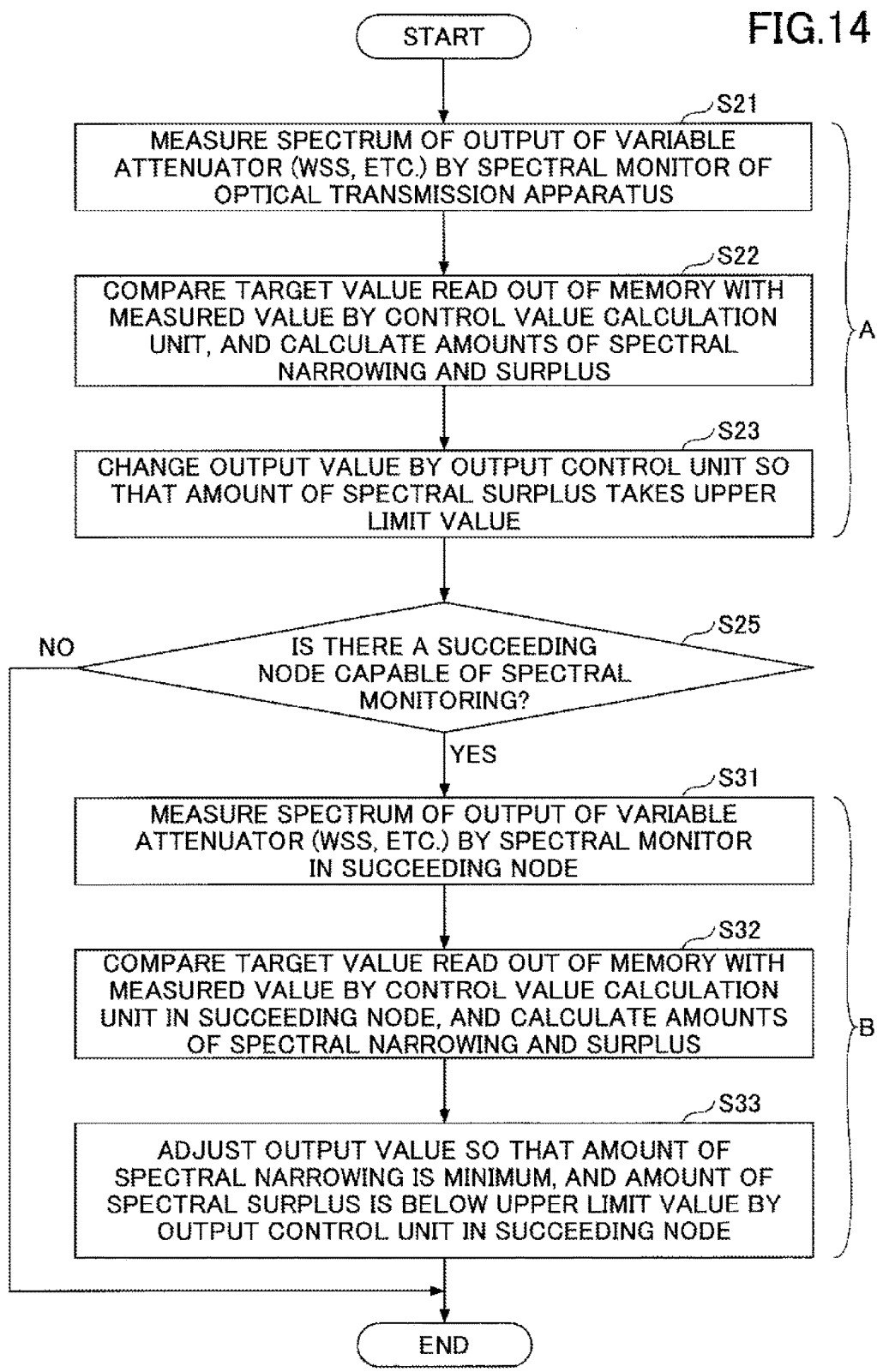

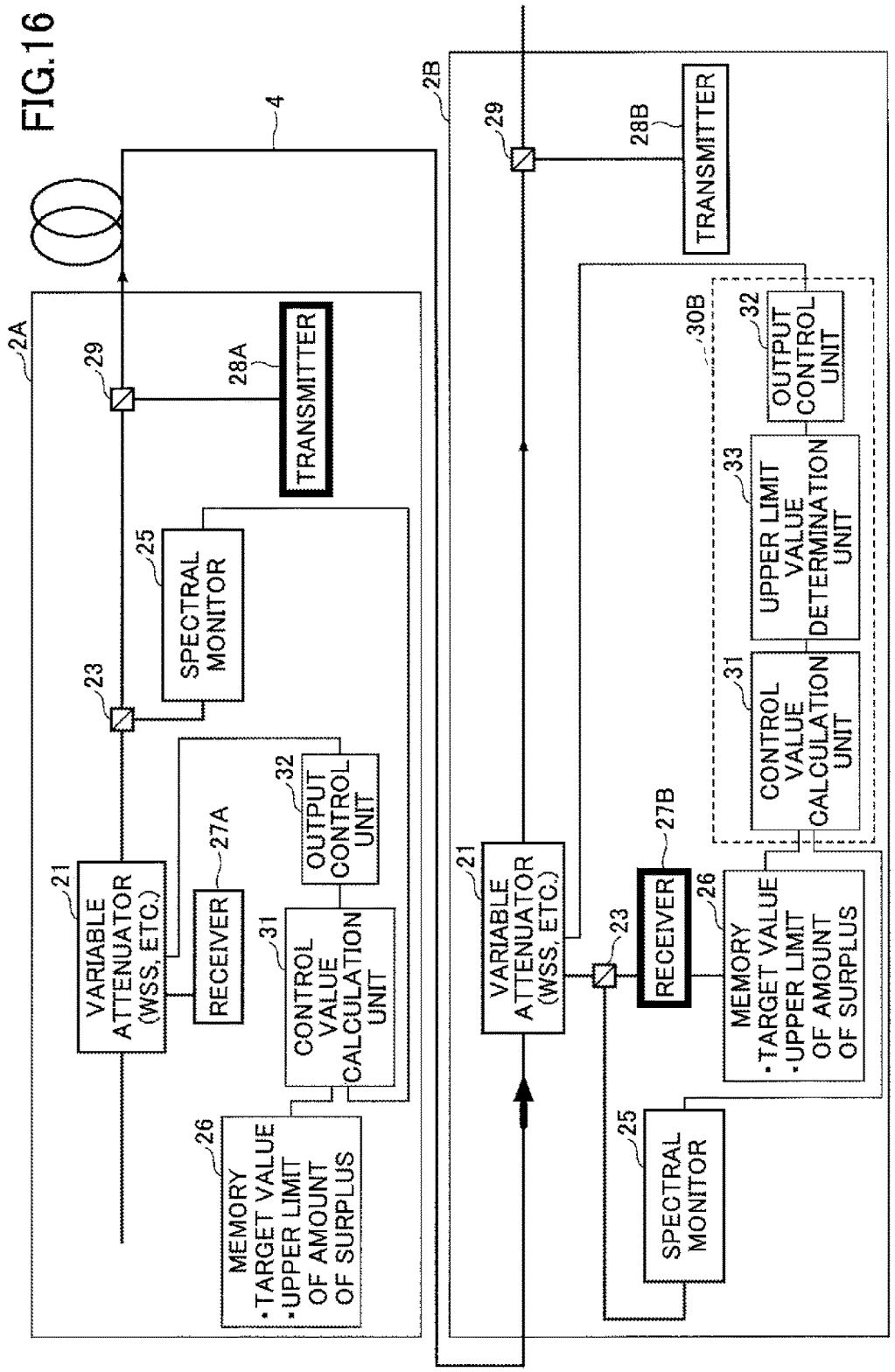

OPTICAL TRANSMISSION APPARATUS, OPTICAL TRANSMISSION SYSTEM, AND METHOD OF CONTROLLING OUTPUT OF OPTICAL SIGNAL

CROSS-REFERENCE TO RELATED APPLICATIONS

This application is based upon and claims the benefit of priority of the prior Japanese Priority Application No. 2016-011560 filed on Jan. 25, 2016, the entire contents of which are hereby incorporated by reference.

FIELD

The present disclosure relates to an optical transmission apparatus, an optical transmission system, and a method of controlling output of an optical signal.

BACKGROUND

To cope with ever increasing network traffic, high-density optical multiplexing technologies have been researched such as coherent optical orthogonal frequency division multiplexing (CO-OFDM) and Nyquist wavelength division multiplexing (WDM). CO-OFDM is a technology that places multiple optical signals with fine frequency intervals on the frequency axis by using orthogonality between signals. Nyquist WDM is a method of high-density wavelength division multiplexing for optical signals where the band is limited to the symbol rate frequency. Both communication methods are highly efficient in terms of use of frequencies or wavelengths.

A method of transmitting a signal in which multiple subcarrier signals multiplexed or densely placed as a single signal is also called "super-channel transmission". Collectively transmitting multiple subcarrier signals realizes flexible, large-capacity optical communication. A method has been proposed that controls in advance (pre-emphasizes) the output power level to the transmission line for each subcarrier, to reduce crosstalk between the subcarriers, when executing super-channel transmission (see, for example, Patent Document 1). Also, a method has been proposed that sets the amount of attenuation of a subcarrier signal in an edge part of the band of a super-channel signal to be smaller, and sets the amount of attenuation of a subcarrier signal in a center part of the band of the super-channel signal to be greater, to prevent degradation of optical transmission quality (see, for example, Patent Document 2).

Further, a technology has been known that detects the wavelength of an optical signal by using an optical channel monitor, and corrects a shift between a center wavelength of the optical signal input into a wavelength selective switch, and a center wavelength of a filter transmission band of the wavelength selective switch (see, for example, Patent Document 3).

RELATED-ART DOCUMENTS

Patent Documents

[Patent Document 1] US Laid-open Patent Publication No. 2014/0314416
[Patent Document 2] Japanese Laid-open Patent Publication No. 2013-106328
[Patent Document 3] Japanese Laid-open Patent Publication No. 2014-116642

When multiplexing multiple subcarrier signals and pulse signals to be transmitted as a single optical signal, controlling the output level to an optical transmission line for each subcarrier signal or pulse signal can prevent degradation of signal quality on the transmission line.

However, a variable attenuator such as a wavelength selective switch has a limited wavelength granularity for controlling the amount of attenuation. In an optical signal in which multiple subcarrier signals and pulse signals are densely multiplexed, a single control slot (a wavelength band) may include two adjacent signal components. Since a single target value is generally used in a single control slot of a variable attenuator, the amount of attenuation for each signal becomes deficient or excessive in the wavelength band in which the two signal components are included. The amount of attenuation becoming either deficient or excessive degrades the signal quality.

SUMMARY

According to an aspect in the present disclosure, an optical transmission apparatus includes a variable attenuator configured to adjust output intensity of each wavelength signal included in a multiplexed optical signal having been input; a monitor configured to measure an output spectrum of the variable attenuator; a calculation unit configured to calculate an amount of spectral narrowing and an amount of spectral surplus, based on a measured value by the monitor, and a target value set in advance; and a control unit configured to control an amount of attenuation of the variable attenuator, based on the amount of spectral narrowing and the amount of spectral surplus.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIGS. 1A-1B are diagrams illustrating a technical problem to be solved in optical transmission;

FIG. 7A is a flowchart of a method of controlling output of an optical signal;

FIG. 7B is a flowchart of a method of controlling output of an optical signal;

FIG. 14 is a flowchart illustrating a control method according to the second embodiment;

FIG. 16 is a diagram illustrating a method of describing determination of an upper limit value of the amount of spectral surplus;

DESCRIPTION OF EMBODIMENTS

In the following, embodiments will be described with reference to the drawings.

Figure 1B:
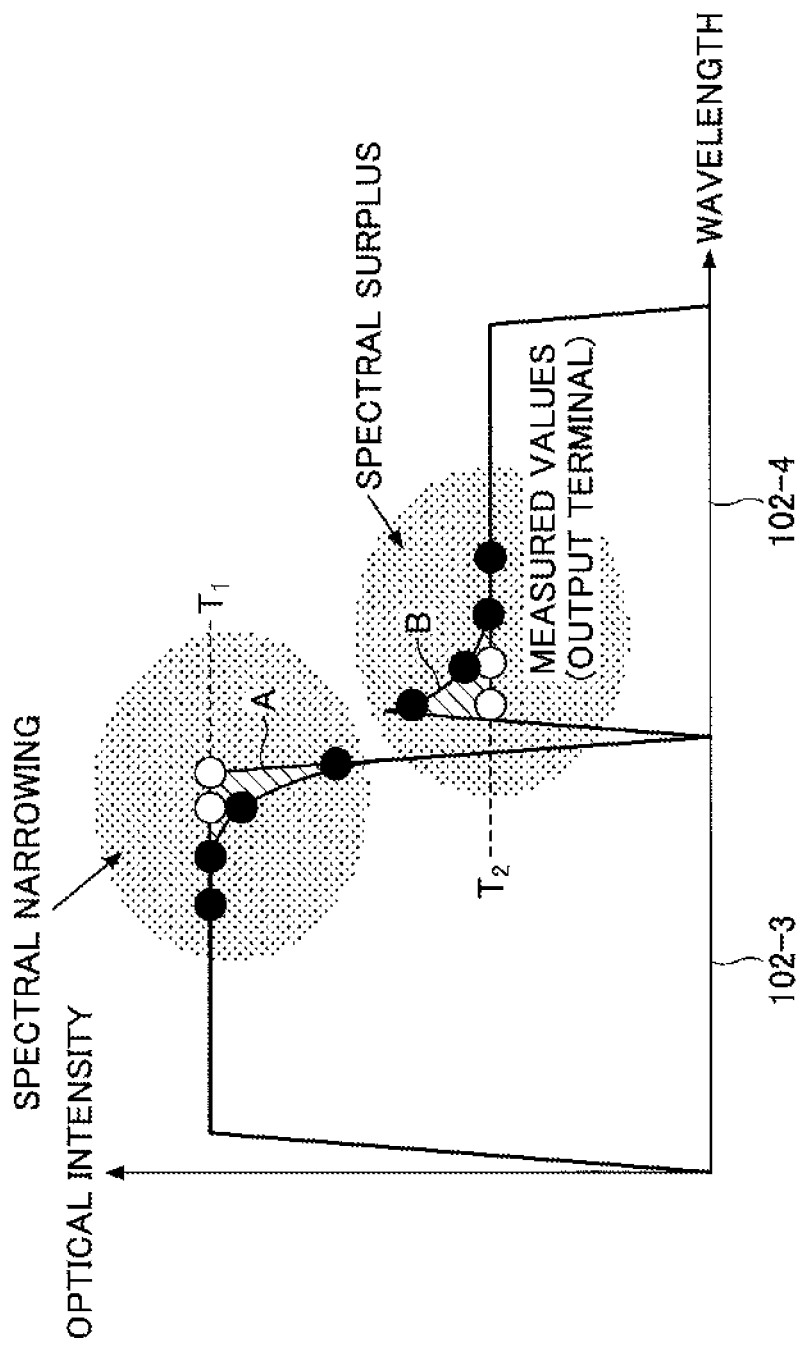

FIGS. 1A-1B are diagrams illustrating a technical problem to be solved in optical transmission, found by the inventors. In FIG. 1A, multiple wavelength signals 102-1 to 102-4 are placed densely, to be transmitted as a multiplexed optical signal 101. The wavelength signals 102-1 to 102-4 are, for example, Nyquist pulse signals in a limited band, or subcarrier signals used in CO-OFDM communication. In the following description, an individual signal that is optically multiplexed, such as a Nyquist pulse signal and a subcarrier signal, will be referred to as a "wavelength signal".

Each of the wavelength signals 102-1 to 102-4 has its gain or intensity level adjusted individually so as to maintain transmission quality of the signal favorably, and then, is output on an optical transmission line. For example, if signal levels of the wavelength signals 102-1 to 102-4 input into a variable attenuator are at levels designated by dashed lines, the output levels to the optical transmission line are adjusted for the respective wavelength signals to form a spectrum shape designated by solid lines. In the example in FIG. 1A, the output levels of the wavelength signals 102-1 and 102-4 at both ends are adjusted to be lower than the output levels of the wavelength signals 102-2 and 102-3 at the center. This control reduces interference in the wavelength signals 102-2 and 102-3 at the center by the wavelength signal 102-1 and 102-4 at both ends, and makes uniform the signal quality of the multiplexed optical signal 101 as a whole. By adjusting the amount of attenuation for each of the multiplexed wavelength signals, it is possible to prevent degradation of transmission quality.

However, when controlling the amount of attenuation for each wavelength signal by using a variable attenuator or a wavelength selective switch, controllability is limited with respect to granularity of wavelengths. In FIG. 1A, granularity of controllable wavelengths or variable attenuation bands where amounts of attenuation are controllable are represented by slots 103. The slot width expected to be used practically at the present stage is about 6.25 GHz.

In each boundary part between wavelength signals adjacent to each other, namely, in each slot 103A including two components of the wavelength signals, the signal quality degrades due to deficiency and excess of the amount of attenuation. As the amount of attenuation to achieve a gain to be obtained, a single value is used for each of the slots 103. When adjusting gains of two components of the wavelength signals by using this single value, it is difficult to optimize the adjacent two wavelength signals at the same time.

Consider a case where a target value T1 is set for controlling output of the wavelength signal 102-3, a target value T2 is set for controlling output of the wavelength signal 102-4, and the intermediate value is used in the corresponding slot 103A to be controlled.

In this case, as illustrated in FIG. 1B, the target gain cannot be obtained at an edge of the wavelength signal 102-3, and spectral narrowing (passband narrowing (PBN)) is generated. The spectral narrowing is represented by a region A designated with slant lines. The spectral narrowing corresponds to excess of the amount of attenuation, which degrades the signal quality.

On the other hand, at an edge of the wavelength signal 102-4, the gain is higher than the target value, and spectral surplus is generated. The spectral surplus is represented by a region B designated with slant lines. The spectral surplus corresponds to deficiency of the amount of attenuation, which also degrades the signal quality.

Figure 2:
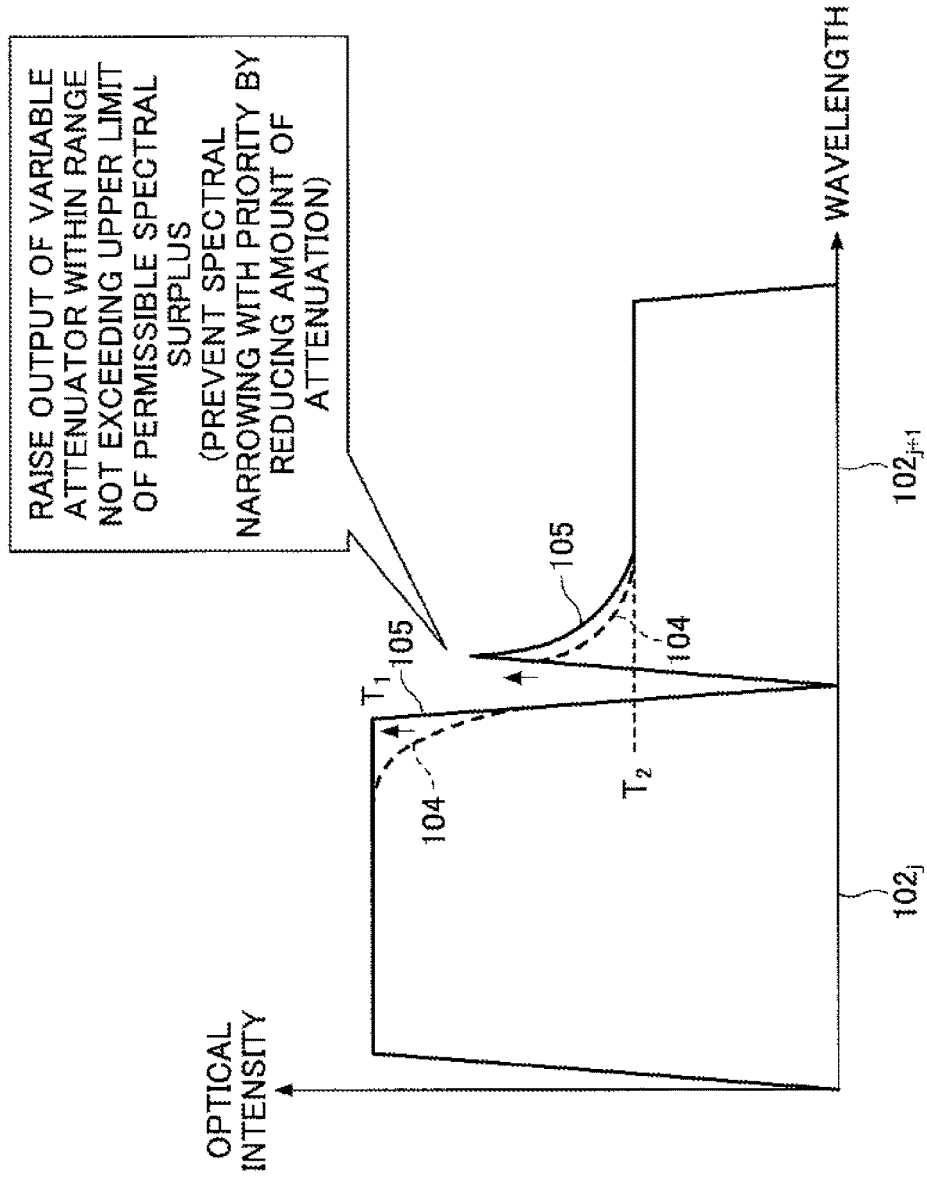
FIG. 2 is a diagram illustrating a basic concept to solve the technical problem.

FIG. 2 is a diagram illustrating a basic concept to solve the technical problem illustrated in FIG. 1. Here, the output spectrum of the variable attenuator is monitored, and based on the target value and the monitored value (measured value), the gain in a variable attenuation band is to be controlled, namely, the amount of attenuation is controlled. The configuration and the method according to the embodiment is especially effective for a case where a slot (a variable attenuation band) 103, which is a minimum unit for controlling output of a variable attenuator, includes two adjacent components of the wavelength signals.

If the slot 103 to be controlled includes two adjacent components of the wavelength signals, a control method considered in general may be to control the sum of the amount of spectral narrowing (the slant lined region A in FIG. 1B) and the amount of spectral surplus (the slant lined region B in FIG. 1B) to be minimized. If such control of minimizing the sum of the amount of spectral narrowing and the amount of spectral surplus is executed, the spectrum of the wavelength signal $102_j$ and the wavelength signal $102_{j+1}$ exhibits a shape designated by dashed lines 104.

In contrast, the control according to the embodiment pays attention to degradation of signal quality by spectral narrowing, and prioritizes compensation for spectral narrowing over spectral surplus, and allows spectral surplus within a certain range. Specifically, an upper limit value is set as a permissible amount of spectral surplus, and the spectral narrowing is minimized within a range in which the amount of spectral surplus does not exceed the upper limit value.

By executing such control, the spectrum of the wavelength signal $102_j$ and the wavelength signal $102_{j+1}$ exhibits a shape designated by solid lines 105. The target value T1 is obtained for the wavelength signal $102_j$ as the output level to the optical transmission line. The amount of spectral surplus of the wavelength signal $102_{j+1}$ becomes greater on the edge of the side adjacent to the wavelength signal 102-3.

Even if spectral surplus is generated within a predetermined range, the spectral surplus can be compensated for by adaptive equalization in digital signal processing on the reception side. On the other hand, compensation on the reception side is difficult for the spectrum having narrowing (defect) generated. This is because noise is also amplified by adaptive equalization on the reception side, and hence, degradation of the signal quality is inevitable for a part having the narrowing generated.

Therefore, the control is executed for an optical signal to be output to an optical transmission line, to minimize spectral narrowing within a range in which the amount of spectral surplus does not exceed the permissible upper limit value. By this control, it is possible to prevent degradation of transmission quality even if a slot (a variable attenuation band), which is a minimum unit for controlling output of a variable attenuator, includes two adjacent components of the wavelength signals. In the following, specific embodiments will be described.

First Embodiment

Figure 3:
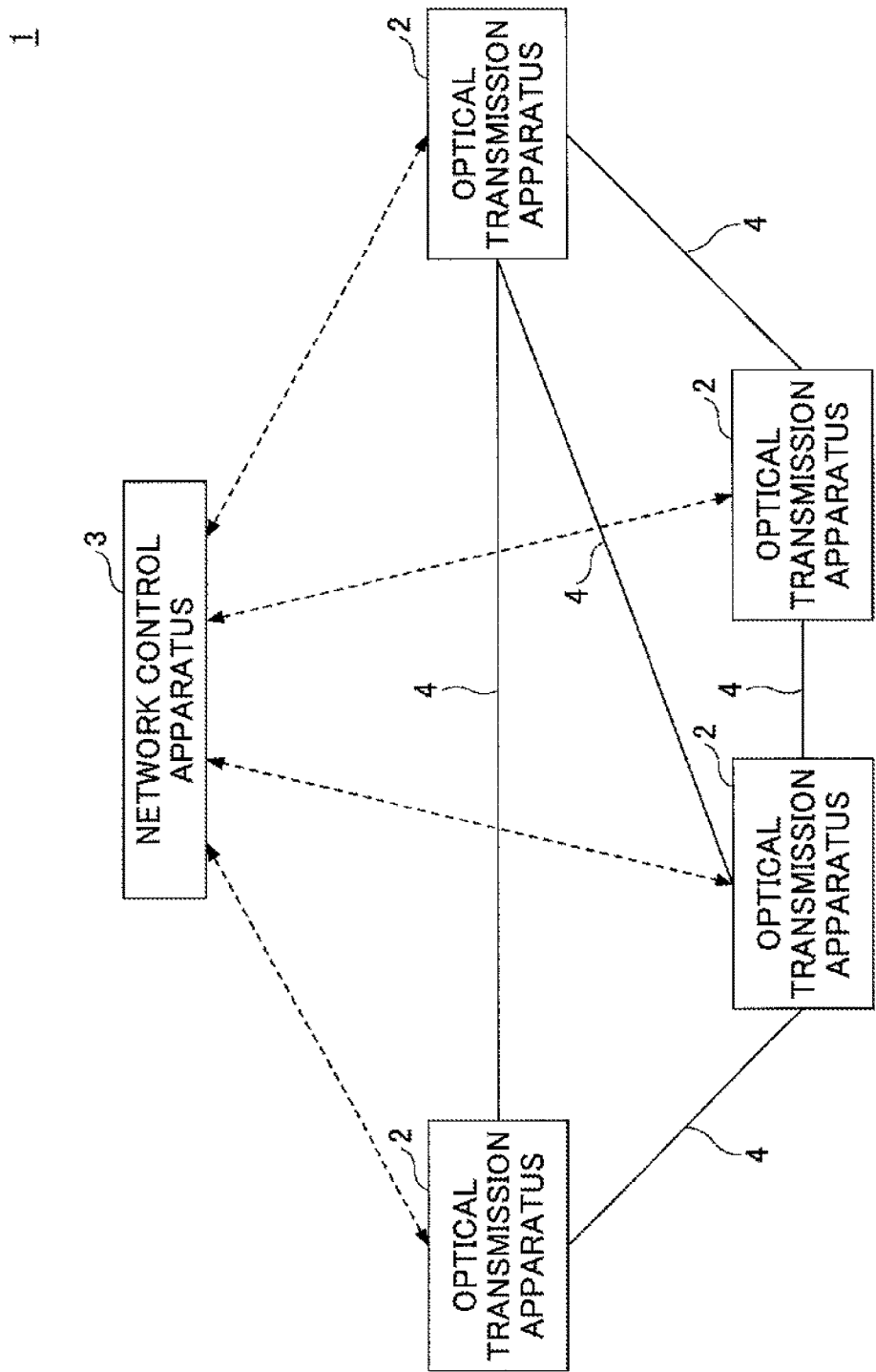
FIG. 3 is a schematic view of an optical transmission system according to a first embodiment.

FIG. 3 is a schematic view of an optical transmission system 1 according to a first embodiment. The optical transmission system 1 includes multiple optical transmission apparatuses 2 connected by optical transmission lines 4 such as optical fibers, and a network control apparatus 3 that manages the optical transmission apparatuses 2. A multiplexed optical signal having multiple wavelength signals multiplexed is transmitted in the optical transmission system 1.

Figure 4:
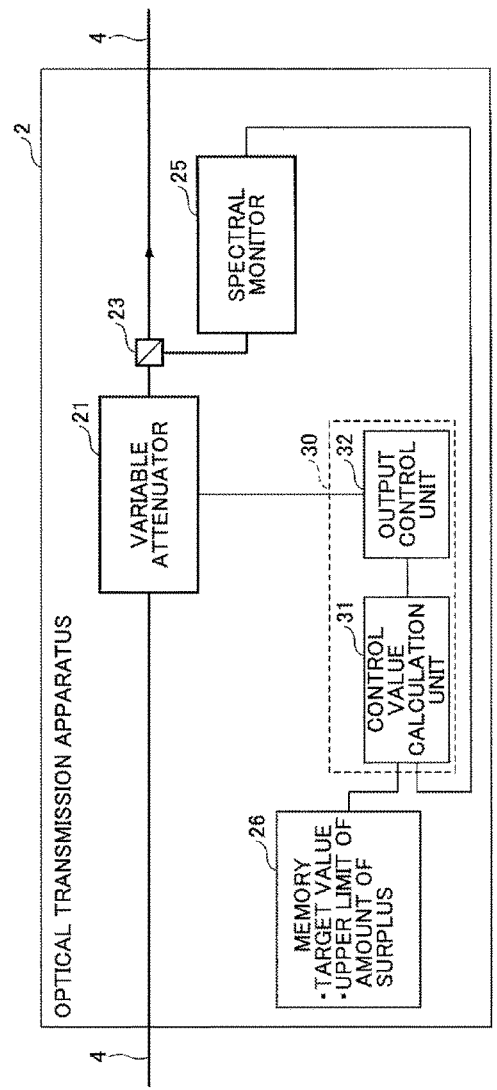
FIG. 4 is a basic configuration diagram of an optical transmission apparatus according to the first embodiment.

FIG. 4 is a basic configuration diagram of the optical transmission apparatus 2. FIG. 4 illustrates only minimum elements for describing the control technology according to the embodiment. Therefore, optical amplifiers and the like are omitted, which may be placed at an input terminal from the optical transmission line 4 and an output terminal to the optical transmission line 4. The optical transmission apparatus 2 may be used as a transmission apparatus for relaying to relay a signal to a next node, or may be used as an optical add/drop apparatus to insert (add) and branch (drop) a signal.

The optical transmission apparatus 2 includes a variable attenuator 21, an optical branch part 23, a spectrum monitor 25, a memory 26, a control value calculation unit 31, and an output control unit 32. The variable attenuator 21 has a function of wavelength spectral separation and a function of adjusting the amount of attenuation, to adjust the gain, namely, the amount of attenuation of each wavelength signal included in a multiplexed optical signal received from the optical transmission line 4, and to output the adjusted signal. Wavelength spectral separation in the variable attenuator 21 is implemented by a spectral separation unit such as a refractive-index-varied array waveguide and a diffracting grating. Adjustment of the amount of attenuation may be an analog adjustment by the voltage, or may be a digital adjustment controlling the coupling ratio by using a micro mirror and the like.

A part of an optical signal output from the variable attenuator 21 is branched by the optical branch part 23 such as a photocoupler, and input into the spectrum monitor 25. The spectrum monitor 25 is constituted with, for example, a variable wavelength filter, a photodetector, and an analog-digital converter, as will be described later. The spectrum monitor 25 measures the spectrum of an optical signal with a predetermined resolution, and outputs the measured result as a digitally-sampled electric signal. The output of the spectrum monitor 25 is connected with the input of the control value calculation unit 31.

The memory 26 stores target values for output control set for respective wavelength signals. The target value stored in the memory 26 is read out appropriately by the control value calculation unit 31. The memory 26 also stores the upper limit value of a permissible amount of spectral surplus. The upper limit value of the amount of spectral surplus is a value determined depending on the performance of an optical transmission apparatus on the reception side, and measured and determined, for example, when the network is activated. A method of determining the upper limit value will be described later.

The control value calculation unit 31 calculates an amount of spectral narrowing and an amount of spectral surplus, based on a measured value obtained by the spectrum monitor 25, and a target value read out from the memory 26. If two adjacent components of the wavelength signals are included in a slot 103 to be controlled, both spectral narrowing and spectral surplus may be generated. The control value calculation unit 31 outputs the amount of spectral narrowing and the amount of spectral surplus to the output control unit 32 as control values. The output control unit 32 controls the amount of attenuation, namely, the output value of the variable attenuator 21, based on the control values calculated by the control value calculation unit 31.

The control value calculation unit 31 and the output control unit 32 may be implemented by discrete analog circuits or digital circuits, or may be implemented by a single microprocessor 30. Alternatively, the memory 26, the control value calculation unit 31, and the output control unit 32 may be implemented by a single integrated circuit such as an ASIC (Application Specific Integrated Circuit).

<Controlling Output Value of Variable Attenuator>

Figure 5A:
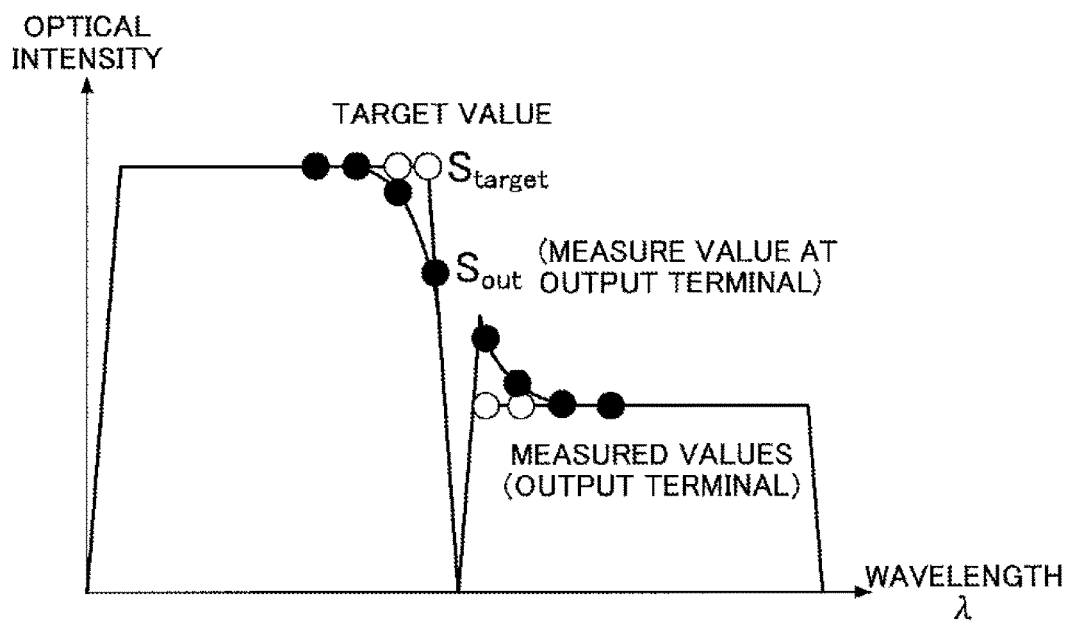
FIGS. 5A-5B are diagrams illustrating spectral narrowing and surplus.

With reference to FIG. 5 and FIG. 6, calculation of the amount of spectral narrowing and control of the amount of attenuation will be described. In FIG. 5A, a point designated by a black circle represents a monitored value ($S_{out}$) output from the spectrum monitor 25, and a point designated by a white circle represents a target value ($S_{target}$). Here, $S_{target}(\lambda)$ represents a target value of the spectrum at a monitored wavelength $\lambda$ monitored by the spectrum monitor 25. $S_{out}(\lambda, \alpha_{ATT})$ represents a monitored value of the spectrum at the wavelength $\lambda$ when the amount of attenuation is a $\alpha_{ATT}$.

$S_{target}(\lambda)$: a target value of a spectrum at a wavelength $\lambda$ $S_{out}(\lambda, \alpha_{ATT})$: a monitored value of the spectrum at a wavelength $\lambda$ when the amount of attenuation is $\alpha_{ATT}$ Representing the difference between the monitored value and target value at the wavelength $\lambda$ when the amount of attenuation is $\alpha_{ATT}$ by $X(\lambda, \alpha_{ATT})$, the difference $X(\lambda, \alpha_{ATT})$ is represented by the following Formula (1).

$$X(\lambda, \alpha_{ATT}) = \frac{S_{out}(\lambda, \alpha_{ATT})}{S_{target}(\lambda)} - 1 \quad (1)$$

Figure 5B:
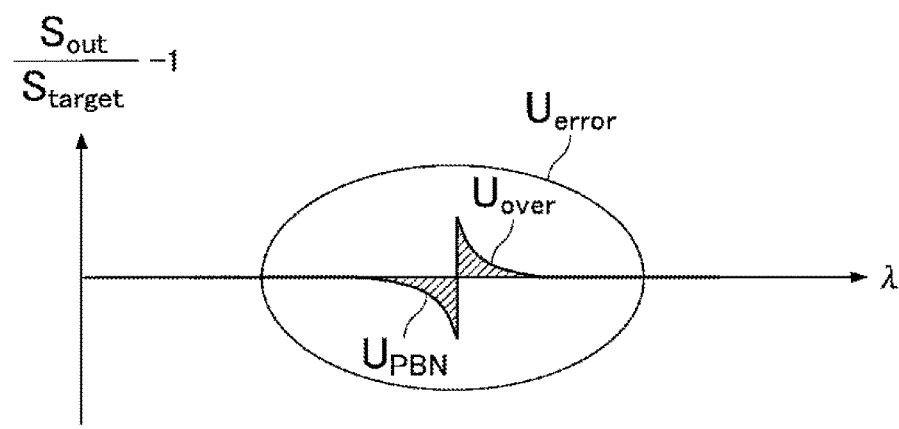

For example, if the monitored value $S_{out}$ is 0.8, and the target value is 1, the difference X is −0.2. In this case, as represented by $U_{PBN}$ in FIG. 5B, narrowing is generated in the spectrum. The horizontal axis in FIG. 5B represents the wavelength $\lambda$, and the vertical axis represents the difference X represented by $[(S_{out}/S_{target})-1]$. If the difference X is represented as a plus value, spectral surplus $U_{over}$ is generated.

An integral value of the amount of spectral narrowing when the amount of attenuation is $\alpha_{ATT}$ is represented by Formula (2).

$$U_{PBN}(\alpha_{ATT}) = \sum_\lambda \left(1 - \frac{S_{out}(\lambda, \alpha_{ATT})}{S_{target}(\lambda)}\right) \text{ if} \qquad (2)$$

$$S_{out}(\lambda, \alpha_{ATT}) < S_{target}(\lambda)$$

In Formula (2), the "if" clause represents a condition that integration is calculated if $S_{out}(\lambda, \alpha_{ATT}) < S_{target}(\lambda)$ namely, a condition that integration is calculated only for a part where the monitored value is below the target value.

The total amount of the difference (absolute value) between the monitored value and the target value at the wavelength λ when the amount of attenuation is $\alpha_{ATT}$ is represented by Formula (3).

$$U_{error}(\alpha_{ATT}) = \sum_\lambda \left|\frac{S_{out}(\lambda, \alpha_{ATT})}{S_{target}(\lambda)} - 1\right| \qquad (3)$$

This $U_{error}(\alpha_{ATT})$ corresponds to the sum of areas of $U_{PBN}$ and $U_{over}$ in FIG. 5B. Therefore, the integral value $U_{over}(\alpha_{ATT})$ of the amount of spectral surplus is obtained by Formula (4) as a value subtracting $U_{PBN}(\alpha_{ATT})$ from $U_{error}(\alpha_{ATT})$.

$$U_{over}(\alpha_{ATT}) = U_{error}(\alpha_{ATT}) - U_{PBN}(\alpha_{ATT}) \qquad (4)$$

Figure 6A:
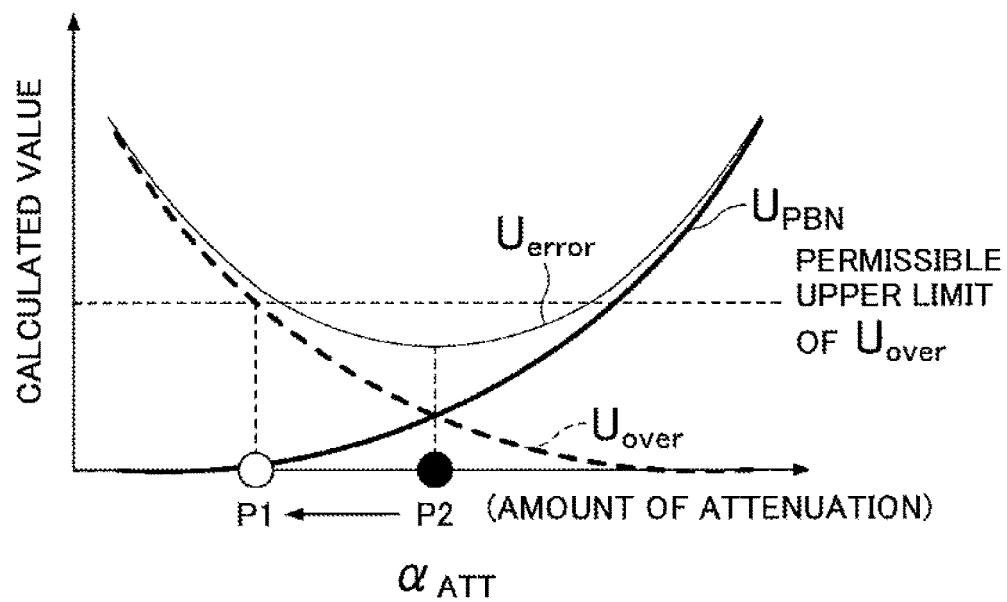
FIGS. 6A-6B are diagrams illustrating a basic concept of controlling output of an optical signal according to the first embodiment.

FIG. 6A illustrates a relationship among $U_{PBN}$, $U_{over}$, and $U_{error}$. General output control may select an amount of attenuation that minimizes $U_{error}$ as the total amount of the difference between the monitored value and the target value (the amount of attenuation at a point P2 on the horizontal axis). In contrast, in the embodiment, the amount of attenuation is determined that minimizes the amount of spectral narrowing $U_{PBN}$ within a range in which the amount of spectral surplus does not exceed the upper limit (the amount of attenuation at a point P1 on the horizontal axis).

Figure 6B:
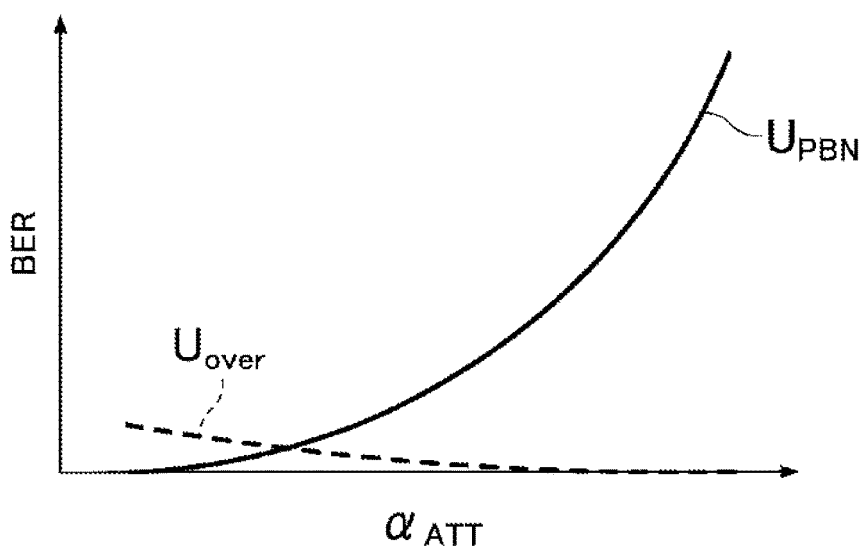

FIG. 6B illustrates a relationship between the amount of attenuation $\alpha_{ATT}$ of the variable attenuator 21 and the signal quality (for example, bit error rate BER). Spectral surplus can be compensated for to a certain extent by adaptive equalization and the like on the reception side, and hence, has smaller influence on the signal quality. On the other hand, spectral narrowing corelates with the signal quality. The greater the amount of attenuation $\alpha_{ATT}$ becomes, namely, the greater the amount of narrowing becomes, the greater the BER is, and the more the signal quality degrades. Thereupon, control is executed to minimize the amount of spectral narrowing $U_{PBN}$ as least as within a permissible range of spectral surplus.

Based on the amount of spectral narrowing $U_{PBN}$ and the amount of spectral surplus $U_{over}$ calculated by the control value calculation unit 31, the output control unit 32 of the optical transmission apparatus 2 controls the output of the variable attenuator 21 so as to minimize the amount of spectral narrowing $U_{PBN}$, and not to have the amount of spectral surplus $U_{over}$ exceed the permissible upper limit value.

FIG. 7A is a flowchart of a method of controlling output of an optical signal in the optical transmission apparatus 2. The spectrum monitor 25 measures the output spectrum of the variable attenuator 21 (Step S11). The control value calculation unit 31 compares the measured value by the spectrum monitor 25 with a target value read from the memory 26 for each slot 103 to be controlled, and calculates the amount of spectral narrowing $U_{PBN}(\alpha_{ATT})$ and the amount of surplus $U_{over}(\alpha_{ATT})$ by Formulas (1) to (4) described above (Step S12). If two adjacent wavelength signals are included in the slot to be controlled, both spectral narrowing and spectral surplus may be generated.

The output control unit 32 changes the output value of the variable attenuator 21 or the amount of attenuation $\alpha_{ATT}$ to a value that minimizes the amount of spectral narrowing $U_{PBN}(\alpha_{ATT})$ (Step S13). Further, the output control unit 32 determines whether the amount of spectral surplus $U_{over}(\alpha_{ATT})$ when the amount of spectral narrowing $U_{PBN}(\alpha_{ATT})$ is minimized, is less than or equal to the upper limit value (Step S14). If the amount of spectral surplus $U_{over}(\alpha_{ATT})$ is less than or equal to the upper limit value (YES at Step S14), the amount of attenuation $\alpha_{ATT}$ set at Step S13 in the variable attenuator 21 is maintained. If the amount of spectral surplus $U_{over}(\alpha_{ATT})$ exceeds the upper limit (NO at Step S14), the output control unit 32 changes the output value of the slot to be controlled or the amount of attenuation of the variable attenuator 21 so that the amount of spectral surplus $U_{over}(\alpha_{ATT})$ takes the upper limit value (Step S15).

Having completed Steps S12 to S15, the output control unit 32 determines whether there is a slot (a variable attenuation band) yet to be controlled (Step S16), and repeats Steps S12 to S15 until the output of all slots are controlled. This process flow may be executed before starting communication, or may be executed during the operation to maintain the transmission quality.

The output control according to the embodiment is especially effective if two adjacent components of the wavelength signals are included in a slot to be controlled of the variable attenuator 21. Even if both spectral narrowing and spectral surplus are generated in the slot being the minimum unit of variable attenuation control, control for minimizing the spectral narrowing is prioritized as long as the amount of spectral surplus does not exceed the upper limit value. Thus, the transmission quality of the signal is maintained.

If only a single wavelength signal is included in the slot to be controlled, $S_{out}$ is controlled to be equivalent to the target value $S_{target}$. Alternatively, Steps S12 to S15 may be executed only for slots in which two components of the wavelength signals are included.

FIG. 7B is a flowchart that includes a step for determining whether only a single wavelength signal is included in a slot. The same steps as in FIG. 7A are assigned the same reference symbols, and their description is omitted. After having measured the spectrum at Step S11, the output control unit 32 determines whether only a single wavelength signal is included in the slot (Step S101). If only a single wavelength signal is included (YES at Step S101), the output control unit 32 controls $S_{out}$ to be equivalent to the target value $S_{target}$, and goes forward to Step S16.

Steps S12 to S15 and Step S102 may be executed after determination at Step S101 has been executed for all slots.

By this method, the output of the variable attenuator 21 is controlled so that the amount of spectral narrowing is minimized within a range where the amount of spectral surplus is contained below the upper limit value.

Second Embodiment

In the first embodiment, it is assumed that every optical transmission apparatus 2 included in the optical transmission system 1 has a spectrum monitor 25, to describe an example where the output level to the optical transmission line 4 is optimized for a single node (the optical transmission apparatus 2). However, it is not always true that every optical node in a network has a spectral monitor 25. Thereupon, in a second embodiment, output control will be described in a case where a network includes an optical node not having the spectrum monitor 25.

Figure 8:
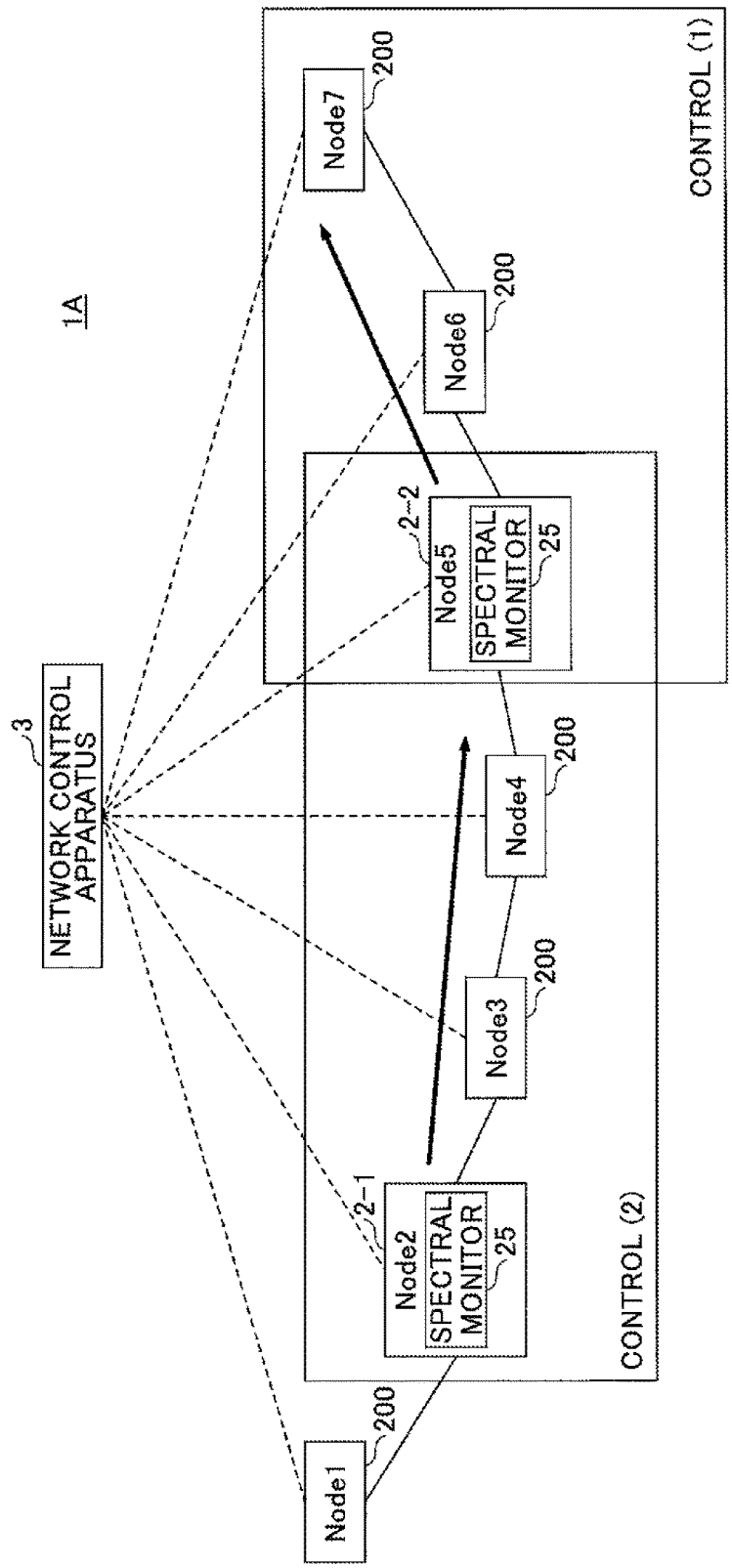
FIG. 8 is a schematic view of an optical transmission system that includes a node not having a spectral monitor according to a second embodiment.

FIG. 8 is a schematic view of an optical transmission system 1A that includes an optical node 200 not having a spectral monitor 25. In the example in FIG. 8, a node 2 and a node 5 are optical transmission apparatuses 2-1 and 2-2 that have spectrum monitors 25, respectively. Nodes 1, 3, 4, 6, and 7 are optical nodes 200 not having a spectrum monitor 25. The optical transmission apparatus 2-1 and 2-2 execute output control, assuming existence of optical nodes 200 not having a spectrum monitor 25.

As the control assuming existence of optical nodes 200 not having a spectrum monitor 25, the following cases will be described:
(1) controlling for a case where no optical transmission apparatus 2 having a spectrum monitor 25 exists as a node at a succeeding stage (Control (1)); and
(2) controlling for a case where an optical node 200 not having a spectrum monitor 25 is interposed between optical transmission apparatuses 2 having respective spectrum monitors 25 (Control (2)).

Figure 9:
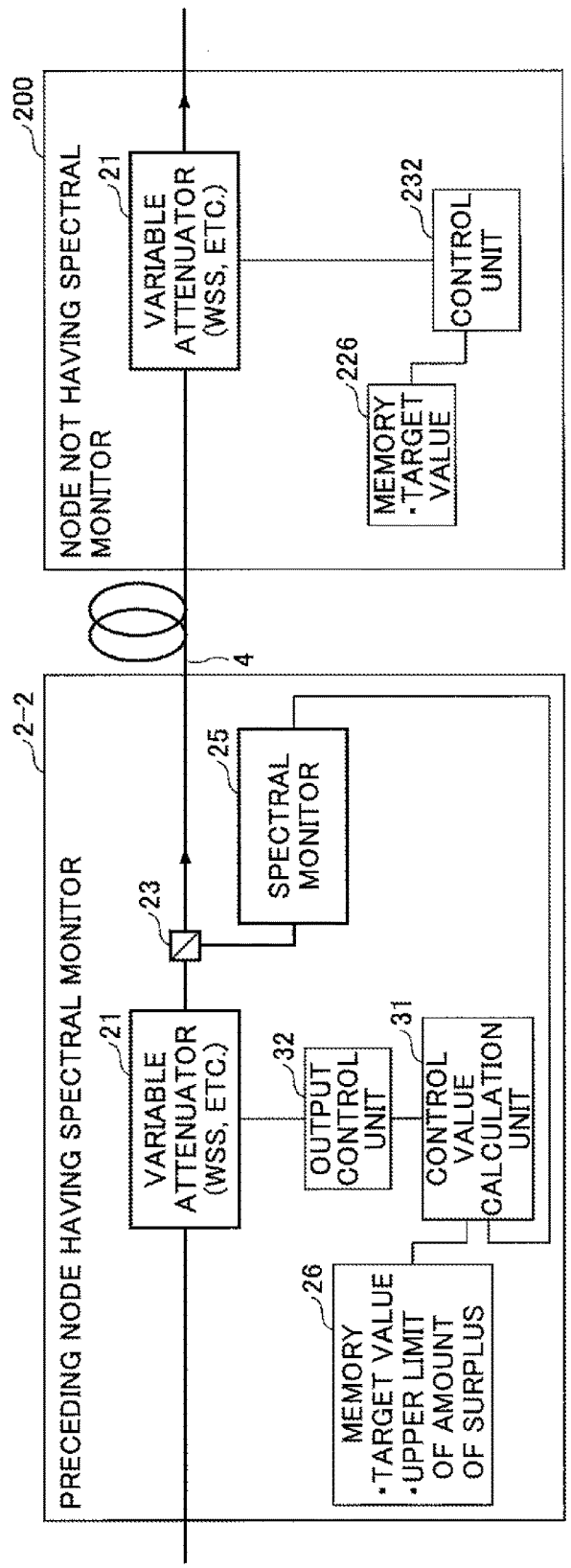
FIG. 9 is a diagram illustrating an example of a configuration of nodes in a case where a node not having a spectral monitor is included.
Figure 10:
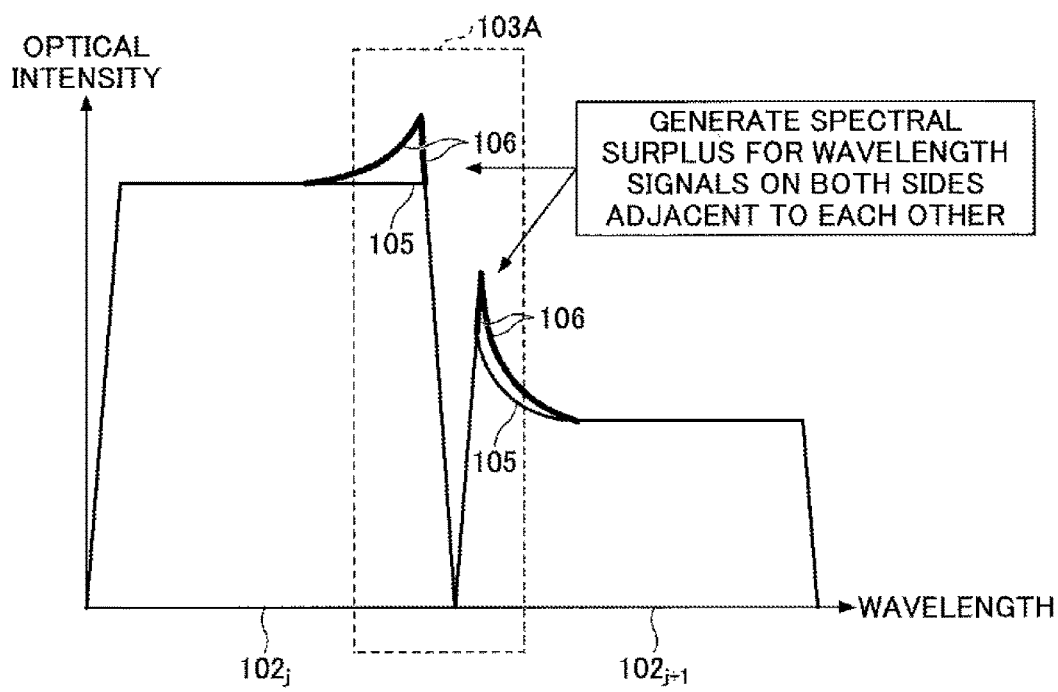
FIG. 10 is a diagram illustrating Control (1) in a case where a node not having a spectral monitor is included.
Figure 11:
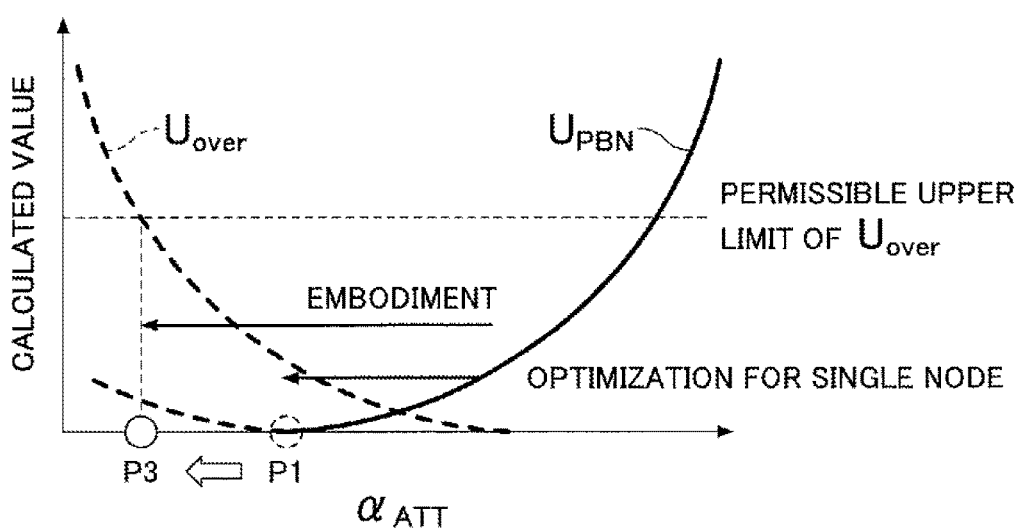
FIG. 11 is a diagram illustrating Control (1) in a case where a node not having a spectral monitor is included.

FIGS. 9 to 11 are diagrams illustrating Control (1). In FIG. 9, consider a case where a multiplexed optical signal is transmitted from an optical transmission apparatus 2-2 having a spectral monitor 25, to an optical node 200 not having a spectral monitor 25.

The optical transmission apparatus 2-2 has the same configuration as the optical transmission apparatus 2 in FIG. 4. The variable attenuator 21 is a wavelength-selective variable attenuator, for which, for example, a wavelength selective switch (WSS) having a function to adjust the amount of attenuation may be used. The wavelength-selective variable attenuator 21 may control, for example, the coupling ratio for coupling light at each wavelength with a corresponding input/output port, to adjust the output level.

In the optical node 200 not having a spectrum monitor 25, the control unit 232 adjusts the output of the variable attenuator 21 level or the amount of attenuation, to match with a target value stored in the memory 226. In the optical node 200, even if two adjacent components of the wavelength signals are included in a slot to be controlled, control is executed to match with a single target value. Therefore, spectral narrowing may be generated at a boundary part of adjacent wavelength signals.

FIG. 10 is a schematic view illustrating output control executed in the optical transmission apparatus 2-2 in FIG. 9. Two adjacent wavelength signals $102_j$ and wavelength signal $102_{j+1}$ are included in a slot 103A to be controlled. Solid lines 105 represent an output spectrum that is obtained by spectral optimization in a single node according to the first embodiment. Bold lines 106 represent an output spectrum that is obtained by Control (1) by the optical transmission apparatus 2-2 according to the second embodiment. The bold lines 106 exhibit spectral surplus generated both in the wavelength signal $102_j$ and the wavelength signal $102_{j+1}$ that are adjacent to each other. The output value of the slot to be controlled of the variable attenuator 21 is increased until the amount of spectral surplus reaches the upper limit.

FIG. 11 is a schematic view illustrating control of the output of the variable attenuator 21 or the amount of attenuation. For optimizing the level of an optical signal in a single node, control is executed to minimize spectral narrowing within a range in which the amount of spectral surplus does not exceed the upper limit. Therefore, the amount of attenuation $\alpha_{ATT}$ of a slot to be controlled of the variable attenuator 21 is controlled to a point P1.

In contrast, Control (1) does not just attempt to minimize spectral narrowing at a part where the spectral narrowing has been generated, but generates spectral surplus up to the upper limit of the amount of spectral surplus, to have output exceeding the target value. The amount of attenuation $\alpha_{ATT}$ of the variable attenuator 21 is set to a value at a point P3, which is further smaller than the point P1. This control has a common point with the output control according to the first embodiment, in terms of making the amount of spectral narrowing zero, namely, set to the minimum. However, to prevent spectral narrowing in advance, spectral surplus is generated beyond a target value.

Whether the output value of a wavelength signal having spectral narrowing generated is increased higher than the target value, may be indicated from the network control apparatus 3 to the optical transmission apparatus 2-2 every time the network topology is changed or the path is switched. If two adjacent wavelength signals are included in a slot to be controlled of the variable attenuator 21, the optical transmission apparatus 2-2 calculates the amount of spectral narrowing and the amount of spectral surplus by Formula (1) to Formula (4). The optical transmission apparatus 2-2 corrects the spectral narrowing, and raises the output of the slot to be controlled of the variable attenuator 21 until the amount of spectral surplus reaches the upper limit. Thus, even if the optical node 200 at the succeeding stage adjusts the amount of attenuation for a multiplexed wavelength signal, and excess or deficiency of the adjustment is generated, the spectral narrowing can be checked to the minimum.

Figure 12:
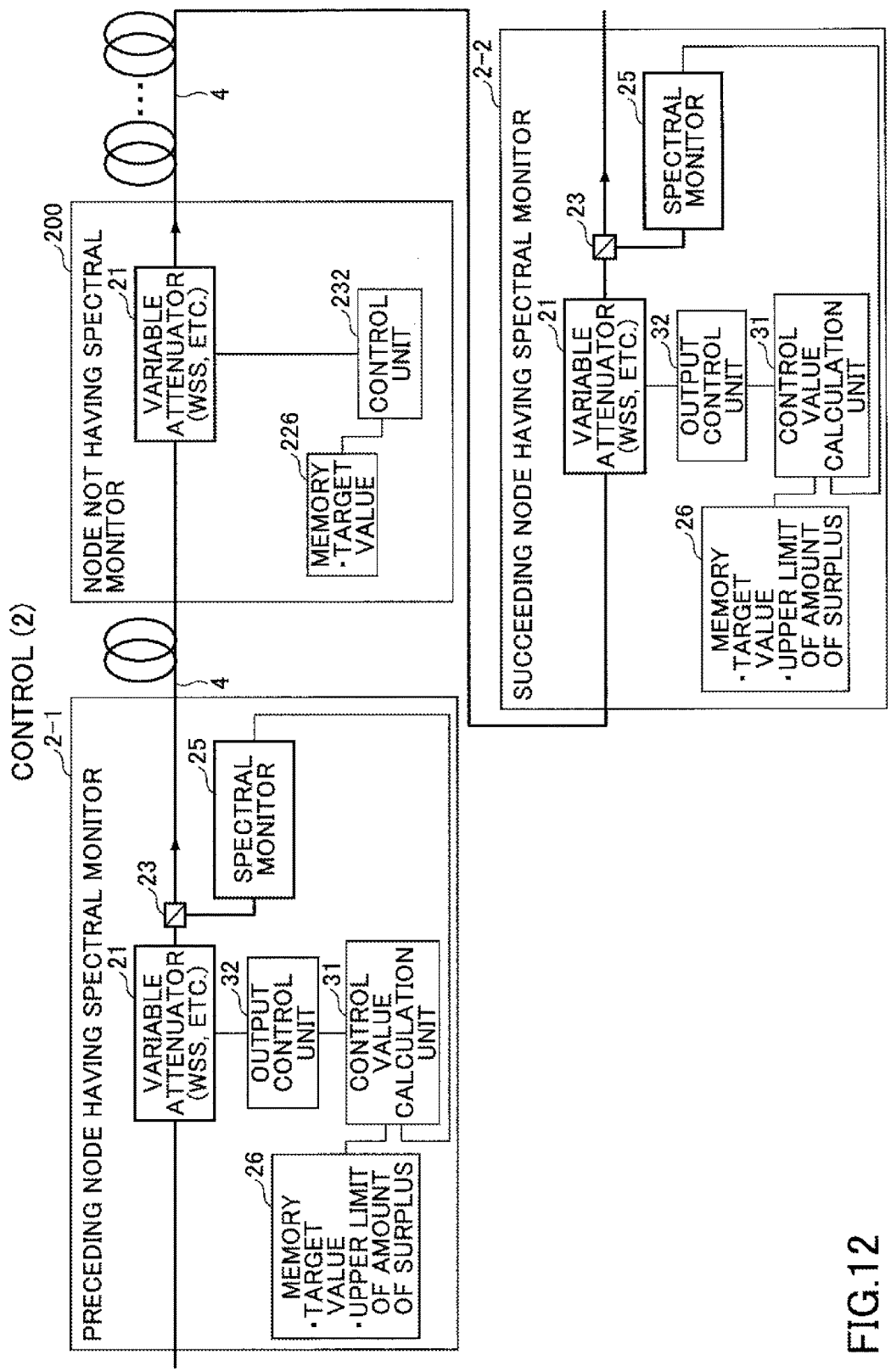
FIG. 12 is a diagram illustrating another example of a configuration of nodes in a case where a node not having a spectral monitor is included.
Figure 13:
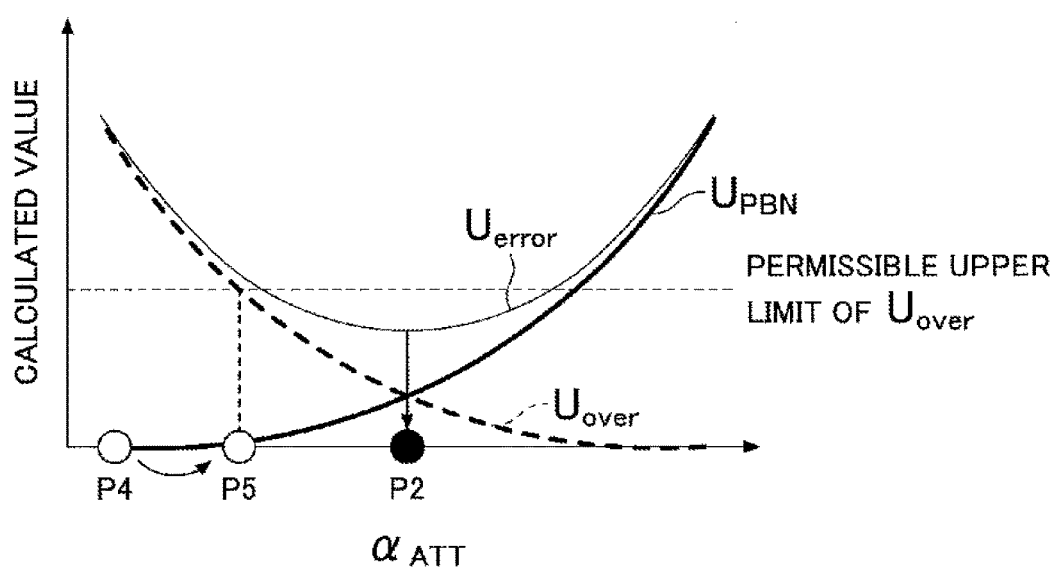
FIG. 13 is a diagram illustrating Control (2) in a case where a node not having a spectral monitor is included.

FIGS. 12 to 14 are diagrams illustrating Control (2). In FIG. 12, an optical node 200 not having a spectral monitor 25 is interposed between the optical transmission apparatus 2-1 and the optical transmission apparatus 2-2 having respective spectral monitors 25. The optical transmission apparatuses 2-1 and 2-2 execute control for compensating for spectral narrowing that may be generated in the optical node 200 in-between, and maintaining the amount of spectral surplus within a permissible range. The configuration of the optical transmission apparatus 2-1 or 2-2 is the same as the configuration of the optical transmission apparatus 2 in FIG. 4. As the variable attenuator 21, for example, a wavelength selective switch (WSS) having a function to adjust the amount of attenuation is used. The optical node 200 is the same as the optical node 200 in FIG. 9.

Every time the network topology is changed or the path is switched, the optical transmission apparatuses 2-1 and 2-2 receive a control signal that represents whether to execute controlling the output value of a wavelength signal having spectral narrowing generated to be higher than a target value, from the network control apparatus 3.

Based on the command from the network control apparatus 3, the optical transmission apparatus 2-1 at the preceding stage corrects the spectral narrowing, and increases the output of a slot to be controlled of the variable attenuator 21 until the amount of spectral surplus reaches the upper limit. When a multiplexed optical signal having the output control applied in this way is input into the optical transmission apparatus 2-2 at the succeeding stage, there may be a case where the amount of spectral surplus is over the upper limit due to influence of the performance of the optical transmission line 4 and the optical node 200 and the like. In such a case, based on the amount of spectral narrowing and the amount of spectral surplus that have been calculated, the optical transmission apparatus 2-2 weakens the output of the variable attenuator 21 (increases the amount of attenuation) of the apparatus itself so that the amount of spectral surplus returns to the range within the upper limit as long as the amount of spectral narrowing is contained in a minimum range. Thus, quality degradation of the multiplexed optical signal output to the optical transmission line 4 can be prevented.

FIG. 13 is a schematic view of the output control in the optical transmission apparatus 2-2. This is similar to the output control according to the first embodiment in that the amount of attenuation is reduced from a point P2 at which the total $U_{error}$ of the amount of spectral narrowing and the amount of spectral surplus is minimum, to prioritize prevention of spectral narrowing generation. Assume that the amount of attenuation $\alpha_{ATT}$ of a slot to be controlled of the variable attenuator 21 has been set to a point P4 by the previous process. In the previous process, at the point P4, the amount of attenuation takes the minimum, and the amount of spectral surplus takes the upper limit value. Assume that in the current process, the amount of spectral surplus calculated from Formulas (1) to (4) based on a measured value and a target value exceeds the upper limit. In this case, the optical transmission apparatus 2-2 weakens the output of the slot to be controlled of the variable attenuator 21 until the amount of spectral surplus returns to the upper limit. Specifically, the optical transmission apparatus 2-2 increases the amount of attenuation $\alpha_{ATT}$ of the slot to be controlled of the variable attenuator 21 from the point P4 to a point P5.

By this process, quality degradation of the multiplexed optical signal output to the optical transmission line 4 can be prevented.

FIG. 14 is a flowchart illustrating the control executed in the optical transmission apparatuses 2-1 and 2-2 included in the optical transmission system 1A. This control flow includes a flow A and a flow B. The flow A corresponds to a process executed in the optical transmission apparatus 2-2 according to Control (1), or a process in the optical transmission apparatus 2-1 at the preceding stage according to Control (2). The flow B corresponds to a process executed in the optical transmission apparatus 2-2 at the succeeding stage according to Control (2). In the following description, the optical transmission apparatus 2-1 or 2-2 may be generally referred to as the "optical transmission apparatus 2".

The optical transmission apparatus 2 measures the output spectrum of the variable attenuator 21, such as a WSS, by the spectrum monitor 25 in the apparatus itself (Step S21). The control value calculation unit 31 compares a measured value obtained by the spectrum monitor 25 with a target value read from the memory 26, and calculates the amount of spectral narrowing and the amount of spectral surplus from Formulas (1) to (4) (Step S22).

Next, based on the calculated amount of spectral narrowing and the amount of spectral surplus, the output control unit 32 changes the output value of a slot to be controlled of the variable attenuator 21, to a value with which the amount of spectral surplus takes the upper limit (Step S23). By this change of the output value, the amount of spectral narrowing becomes minimum (zero). If two adjacent components of the wavelength signals are included in the slot to be controlled, spectral surplus may be generated in both wavelength signals. If only a single wavelength signal is included in the slot to be controlled of the variable attenuator 21, the output of the variable attenuator 21 is controlled to an output level that corresponds to the upper limit value of the amount of spectral surplus, not only for a case where the measured value exceeds the target value, but also for a case where the measured value is under the target value.

The process flow branches off depending on whether a node capable of spectral monitoring exists at the succeeding stage of the optical transmission apparatus 2 (Step S25). If a node capable of spectral monitoring does not exist at the succeeding stage of the optical transmission apparatus 2 (NO at Step S25), the output control of the optical transmission apparatus 2 in the network ends, which corresponds to Control (1) described above. The optical node 200 at the succeeding stage (see FIG. 8) executes general output control on the output of the variable attenuator to match with the target value. Even for a case in which spectral narrowing may generate at the boundary part between two adjacent wavelength signals, degradation of transmission quality can be prevented because the output is compensated for in advance by the optical transmission apparatus 2 at the preceding stage.

If a node capable of spectral monitoring exists at the succeeding stage of the optical transmission apparatus 2 (YES at Step S25), the control flow B is executed by the optical transmission apparatus 2 at the succeeding stage, which corresponds to Control (2).

The optical transmission apparatus 2 at the succeeding stage measures the output spectrum of the variable attenuator 21, such as a WSS, by the spectrum monitor 25 in the apparatus itself (Step S31). The control value calculation unit 31 compares a measured value obtained by the spectrum monitor 25 with a target value read from the memory 26, and calculates the amount of spectral narrowing and the amount of spectral surplus from Formulas (1) to (4) (Step S32).

If the amount of spectral surplus calculated at Step S32 exceeds the upper limit, the output control unit 32 of the optical transmission apparatus 2 at the succeeding stage puts the amount of spectral surplus back to the upper limit value. More specifically, the output control unit 32 increases the amount of attenuation of the slot to be controlled of the variable attenuator 21, and changes the output value of the variable attenuator 21 so that the amount of spectral narrowing becomes minimum within a range of the upper limit value of the amount of spectral surplus (Step S33). Since the amount of spectral narrowing can be checked to the minimum within a range of the upper limit value of the amount of spectral surplus, degradation of transmission quality can be prevented.

<Determination of Upper Limit Value of Amount of Spectral Surplus>

With reference to FIG. 15A to FIG. 18, determination of the upper limit value of the amount of spectral surplus will be described. Determination of the upper limit value of the amount of spectral surplus described in the following is applied to both the first embodiment and the second embodiment.

Figure 15A:
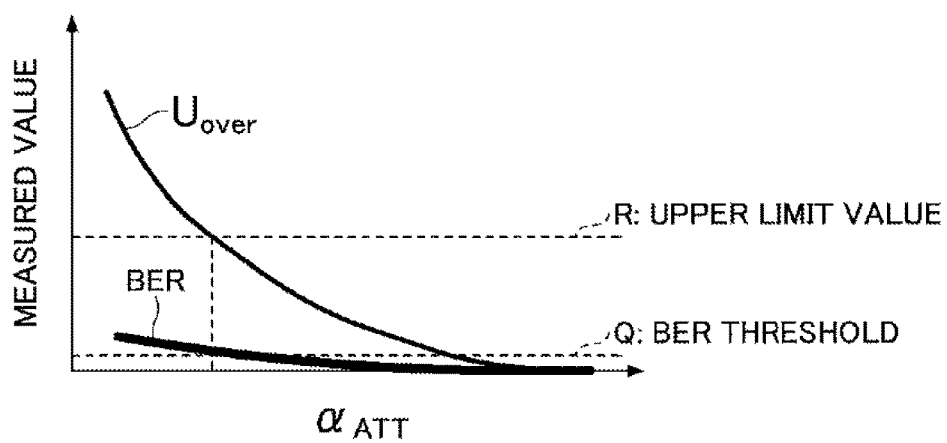
FIGS. 15A-15B are diagrams illustrating determination of an upper limit value of the amount of spectral surplus.

The upper limit value of the amount of spectral surplus is determined by the performance (adaptive equalization capability) on the reception side. FIG. 15A illustrates the amount of spectral surplus $U_{over}$, and the bit error rate BER, as functions of the amount of attenuation $\alpha_{ATT}$, respectively. The upper limit of BER that can be compensated for by adaptive equalization on the reception side is a threshold Q. Here, R represents the upper limit value of the amount of spectral surplus $U_{over}$ when the BER at the succeeding stage node takes the threshold Q. Note that the parameter representing signal quality is not limited to the BER, but another parameter may be used such as carrier-to-noise ratio (CN ratio).

Figure 15B:
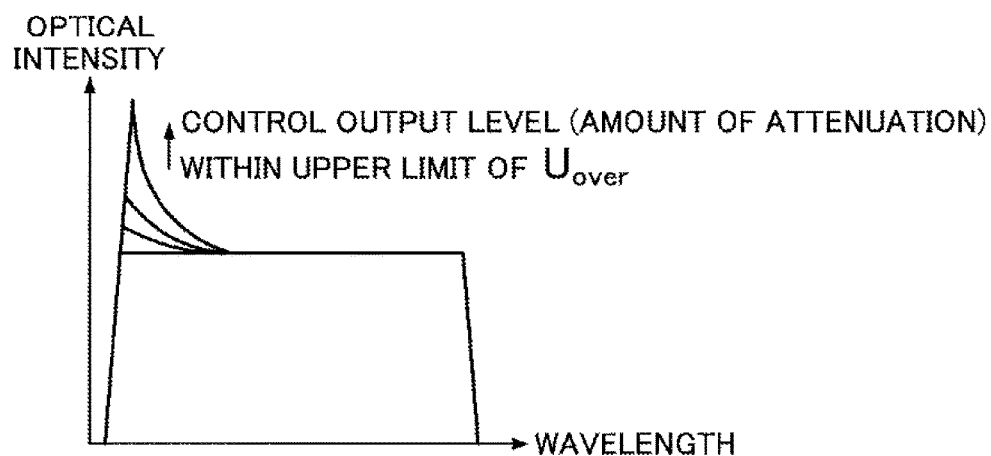

As illustrated in FIG. 15B, the transmission side controls the output level (or the amount of attenuation) of the variable attenuator 25 within a range not exceeding the upper limit of the amount of spectral surplus $U_{over}$.

FIG. 16 illustrates a configuration of an optical transmission apparatus 2A and an optical transmission apparatus 2B used for determination of the upper limit value of the amount of spectral surplus. The upper limit of the amount of spectral surplus is determined by measuring the BER along with the amount of spectral surplus, for example, when the network is activated in a state where the optical transmission apparatus 2A is connected with the optical transmission apparatus 2B. For convenience's sake, FIG. 16 illustrates only those elements that are required when an optical signal for testing is transmitted from the optical transmission apparatus 2A to the optical transmission apparatus 2B.

The optical transmission apparatus 2A includes a wavelength-selective variable attenuator (a WSS, etc.) 21, an optical branch part 23, a spectrum monitor 25, a memory 26, a control value calculation unit 31, an output control unit 32, and in addition, a receiver 27A, a transmitter 28A, and an optical multiplexer 29.

The optical transmission apparatus 2B includes a wavelength-selective variable attenuator (a WSS, etc.) 21, an optical branch part 23, a spectrum monitor 25, a memory 26, a control value calculation unit 31, an output control unit 32, and in addition, a receiver 27B, a transmitter 28B, and optical multiplexer 29, and an upper limit value determination unit 33. The control value calculation unit 31, the upper limit value determination unit 33, and the output control unit 32 may be implemented by, for example, a single processor 30B, or may be implemented as discrete circuits. Also, the upper limit value determination unit 33 may be embedded in the output control unit 32 as a part.

An optical signal for testing is output from the transmitter 28A of the optical transmission apparatus 2A. The optical signal for testing is output to the optical transmission line 4 via the optical multiplexer 29, and received by the optical transmission apparatus 2B. In the optical transmission apparatus 2B, wavelength signals are branched off by the variable attenuator 21, to be input into the receiver 27B. A part of the optical signal is branched by the optical branch part 23, to be measured by the spectrum monitor 25. The receiver 27B includes, for example, an error detection circuit, and based on the output of the error detection circuit, the BER is measured. The measured BER is stored in, for example, the memory 26.

The control value calculation unit 31 calculates the amount of spectral surplus based on a measured value of the spectrum monitor 25 and a target value stored in the memory 26. The output control unit 32 increases the output value of the variable attenuator 21 until the BER reaches the threshold Q as the permissible limit (decreases the amount of attenuation). While increasing the output value of the variable attenuator 21, the output control unit 32 controls measuring the BER and the amount of spectral surplus. Once the BER has reached the threshold Q, the upper limit value determination unit 33 determines the amount of spectral surplus at that moment as the upper limit value of the amount of spectral surplus.

By the configuration in FIG. 16, the upper limit value of the amount of spectral surplus is determined including an influence of the optical transmission line 4.

Figure 17:
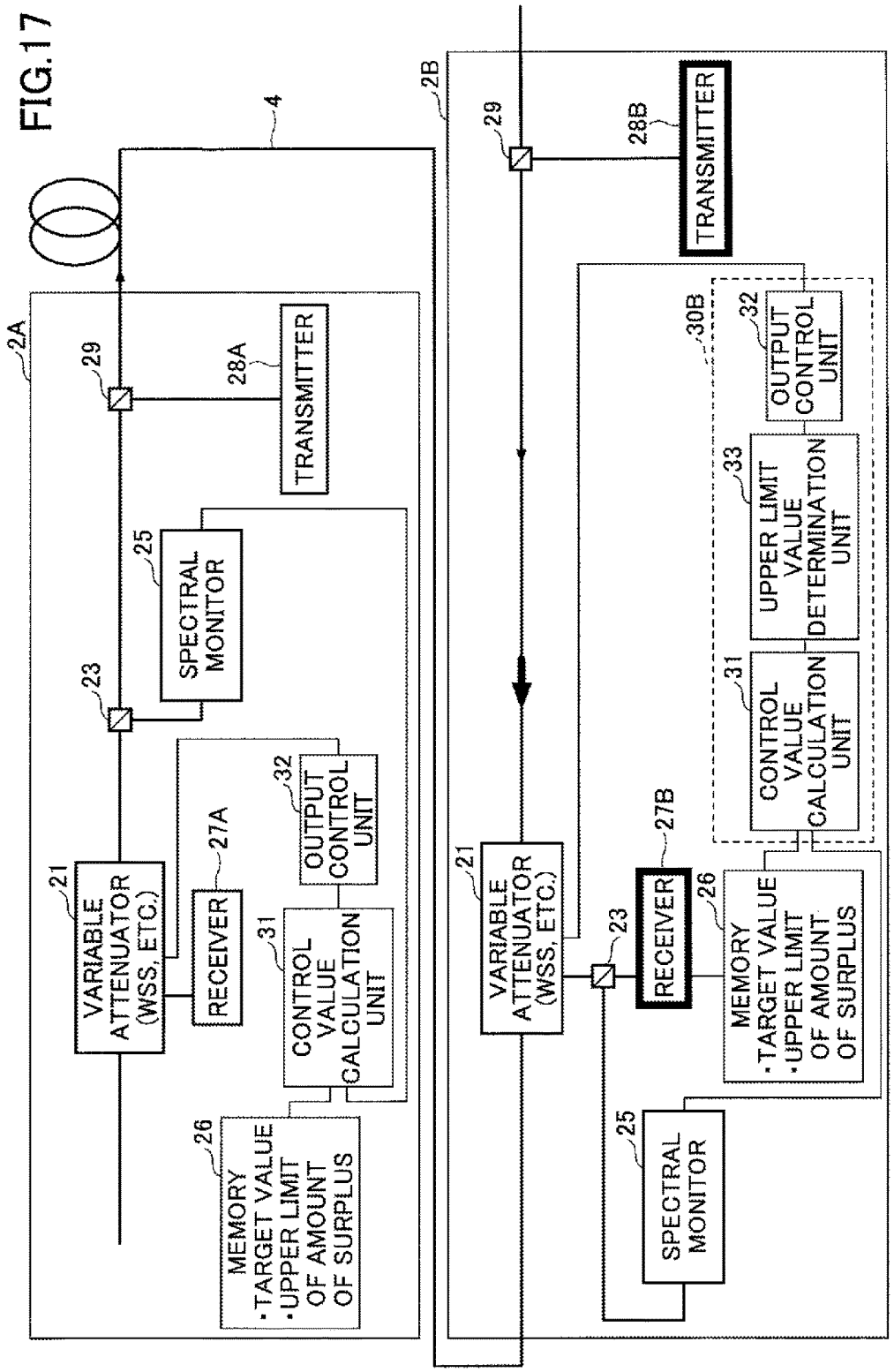
FIG. 17 is a diagram illustrating a method of describing determination of an upper limit value of the amount of spectral surplus.

FIG. 17 illustrates another method of determining the upper limit value of the amount of spectral surplus. In FIG. 17, the optical transmission apparatus 2B by itself determines the upper limit value of the amount of spectral surplus. For convenience's sake, FIG. 17 illustrates only those elements that are required for determining the upper limit value of the amount of spectral surplus. An optical signal for testing is transmitted from the transmitter 28B of the optical transmission apparatus 2B to the receiver 27B of the apparatus itself via the optical multiplexer 29. Wavelength signals are branched off by the variable attenuator 21, and the BER is measured by the receiver 27B. A part of the optical signal is branched by the optical branch part 23, to be measured by the spectrum monitor 25.

While increasing the output value of the variable attenuator 21, the output control unit 32 controls measuring the BER and the amount of spectral surplus. Once the BER has reached the threshold Q, the upper limit value determination unit 33 determines the amount of spectral surplus at that moment as the upper limit value of the amount of spectral surplus. The determined upper limit value of the amount of spectral surplus is used for controlling output from the optical transmission apparatus 2A at the preceding stage to the optical transmission line 4. By the configuration in FIG. 17, the upper limit value of the amount of spectral surplus can be determined, without setting up reception and transmission with the optical transmission apparatus 2A on the other end.

Figure 18:
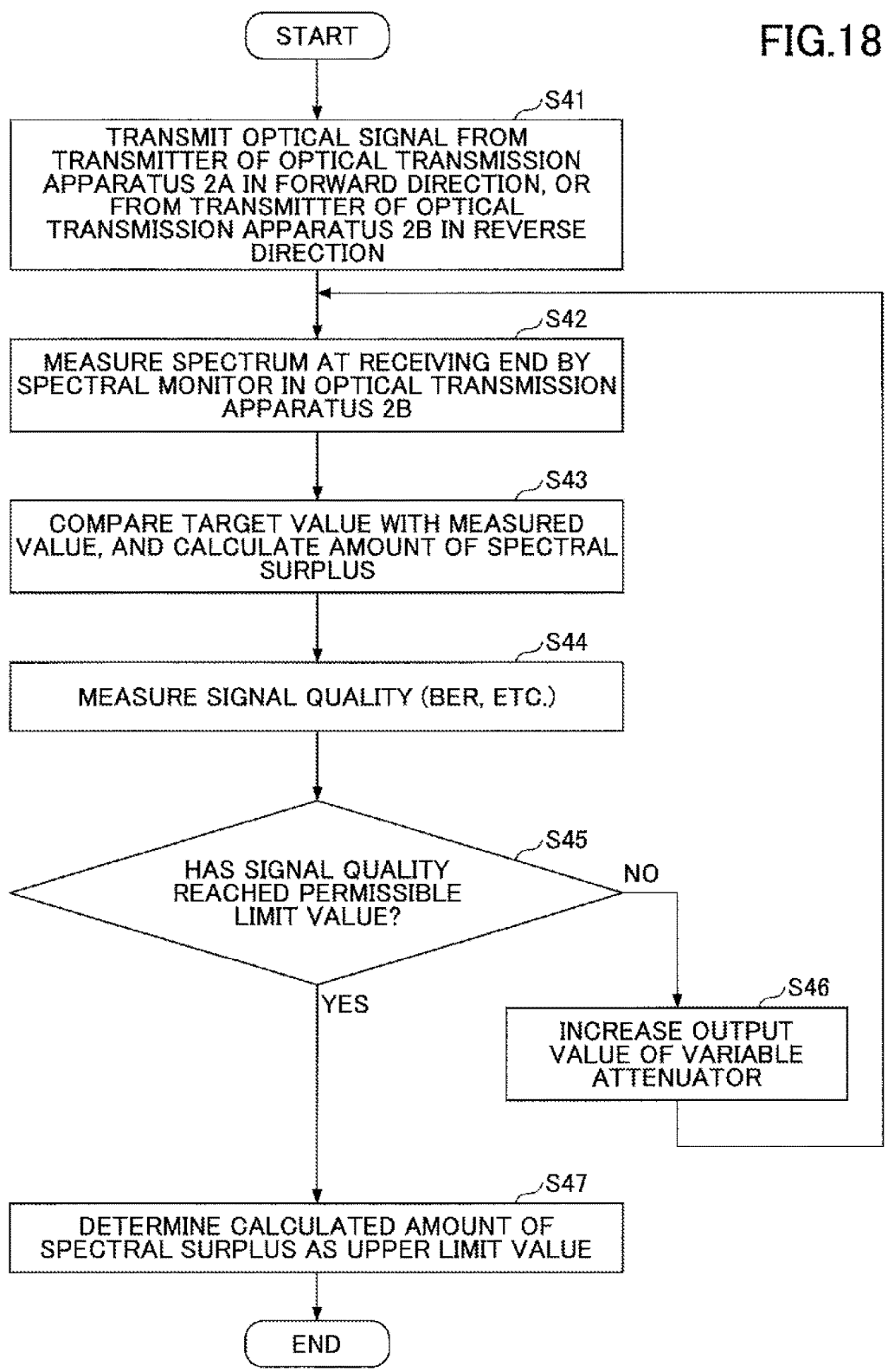
FIG. 18 is a flowchart of a method of determining the upper limit value of the amount of spectral surplus.

FIG. 18 is a flowchart of determining the upper limit value of the amount of spectral surplus. An optical signal for testing is transmitted from the transmitter 28A of the optical transmission apparatus 2A in the forward direction, or from the transmitter 28B of the optical transmission apparatus 2B in the reverse direction (Step S41). The spectrum monitor 25 in the optical transmission apparatus 2B measures the spectrum at the receiving terminal (Step S42).

The control value calculation unit 31 of the optical transmission apparatus 2B compares a target value read from the memory 26 with the measured value, to calculate the amount of spectral surplus (Step S43). At the same time as Step S43, or before or after Step S43, the receiver 27B of the optical transmission apparatus 2B measures the signal quality such as the BER (Step S44). The upper limit value determination unit 33 determines whether the signal quality has reached a permissible limit value (threshold Q) (Step S45). If the signal quality has reached the permissible limit value (YES at Step S45), the upper limit value determination unit 33 determines the amount of spectral surplus at that moment as the upper limit value (Step S47). If the signal quality has not reached the permissible limit value, the output control unit 32 of the optical transmission apparatus 2B increases the output value of the variable attenuator 21 (Step S46), and the process goes back to Step S42. By repeating Steps S42 to S45 until the signal quality reaches the permissible limit (threshold Q), the upper limit value of the amount of spectral surplus is determined.

Third Embodiment

Figure 19:
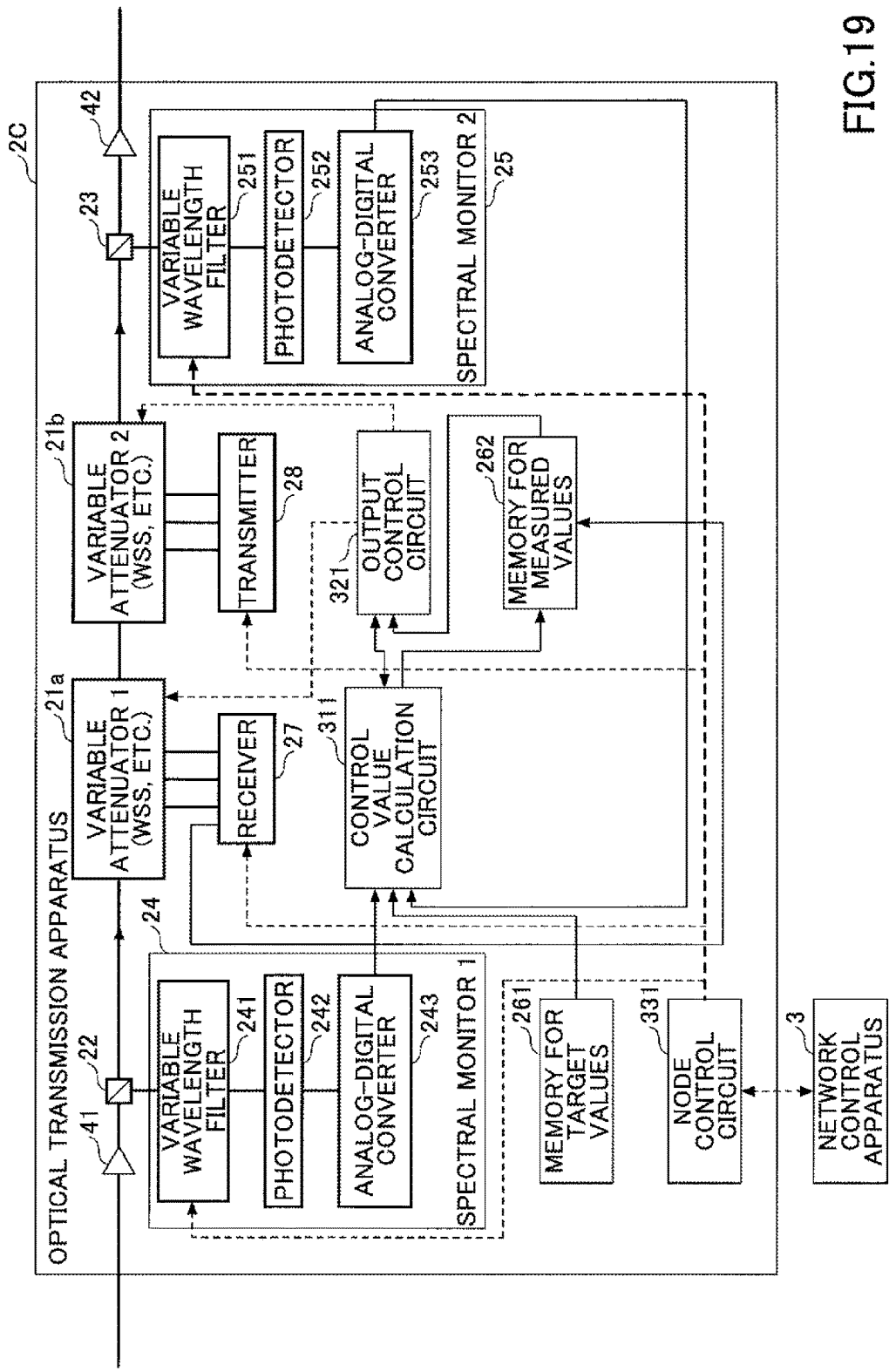
FIG. 19 is a diagram illustrating an example of a configuration of an optical transmission apparatus according to a third embodiment.

FIG. 19 illustrates an example of a configuration of an optical transmission apparatus 2c according to a third embodiment. The optical transmission apparatus 2C executes the output control, and determines the upper limit value of the amount of spectral surplus in response to control signals from a network control apparatus 3. For convenience's sake, FIG. 19 illustrates a configuration when an optical signal is transmitted from the left to the right on the page of the figure.

The output control for minimizing spectral narrowing within a range where the amount of spectral surplus does not exceed the upper limit may be executed with using a control signal from the network control apparatus 3 as a trigger. Also, determining the upper limit value of the amount of spectral surplus may be triggered by a control signal from the network control apparatus 3.

The optical transmission apparatus 2C includes a first optical amplifier 41, a second optical amplifier 42, a first variable attenuator 21a, a second variable attenuator 21b, a first optical branch part 22, a second optical branch part 23, a first spectrum monitor 24, a second spectrum monitor 25, a receiver 27, and a transmitter 28. The second spectrum monitor 25 is mainly used for the output control for minimizing spectral narrowing. The first spectrum monitor 24 is mainly used for determining the upper limit value of the amount of spectral surplus.

The optical transmission apparatus 2C also includes a target value memory 261, a memory for measured values 262, a node control circuit 331, a control value calculation circuit 311, and an output control circuit 321. The target value memory 261 stores a target value of spectrum control. The memory for measured values 262 stores a measurement result of a spectrum, a measurement result of signal quality, the upper limit value of the amount of spectral surplus, and the like. The node control circuit 331 may be included in a communication interface with the network control apparatus 3 as a part. The control value calculation circuit 311 and the output control circuit 321 are logic circuits including a comparison and arithmetic circuit and an integral circuit.

For the output control of the variable attenuator 21b, the node control circuit 331 receives a control signal A commanding the output control from the network control apparatus 3. The control signal A is transmitted to a node on a path whose transmission quality of an optical signal is below the permissible level, for example, based on a monitored result of the network transmission quality by the network control apparatus 3. The control signal A includes a command of the output control and information about wavelengths to be measured.

In response to receiving the control signal A from the network control apparatus 3, the node control circuit 331 supplies a control signal that includes a command to measure the spectrum and information about wavelengths to be measured to the spectrum monitor 25. The supply of the control signal from the node control circuit 331 to the spectrum monitor 25 is designated by a bold dashed line in the figure. The spectrum monitor 25 includes, for example, a variable wavelength filter 251, a photodetector 252, and an analog-digital converter 253. The spectrum monitor 25 monitors the output signal of the variable attenuator 21b based on the control signal, and supplies a measurement result and information about wavelengths to be measured to the control value calculation circuit 311. A signal output to the control value calculation circuit 311 is a digital signal sampled by the analog-digital converter 253. A target value of the spectrum control is also input into the control value calculation circuit 311 from the target value memory 261.

Based on the target value and the measurement result of the spectrum, the control value calculation circuit 311 calculates the amount of spectral narrowing and the amount of spectral surplus from Formulas (1) to (4). The calculated amount of spectral narrowing and the amount of spectral surplus are stored in the memory for measured values 262. The calculated values may be input into the output control circuit 321. The output control circuit 321 refers to the upper limit value of the amount of spectral surplus stored in the memory for measured values 262, and controls the output values or the amounts of attenuation of the variable attenuator 21a and the variable attenuator 21b so that the amount of spectral narrowing becomes minimum and the amount of spectral surplus does not exceed the upper limit.

Next, a case will be described in which the upper limit value of the amount of spectral surplus is determined based on network control. The node control circuit 331 receives a control signal B commanding to determine the upper limit value of the amount of spectral surplus from the network control apparatus 3. In response to the control signal B, the node control circuit 331 supplies a control signal for determining the upper limit value to the first spectrum monitor 24, the receiver 27, and the transmitter 28. The control signal for determining the upper limit value includes, for example, a command to transmit an optical signal for testing, a command to start spectral monitoring for the first spectrum monitor 24, and a command to measure the quality of the optical signal for testing.

The transmitter 28 transmits the optical signal for testing. The optical signal for testing is transmitted in the reverse direction by the variable attenuators 21b and 21a, and received by the receiver 27. The receiver 27 measures the reception quality (the BER, etc.) of the optical signal for testing in response to the control signal. The measured value of BER is stored in the memory for measured values 262.

The output control circuit 321 increases the output values of the variable attenuators 21a and 21b until the measured values of the BER stored in the memory for measured values 256 reach the threshold Q as the permissible limit. The receiver 27 measures the BER for the increased output values, and writes the BER in the memory for measured values 262 sequentially.

The first spectrum monitor 24 starts measuring the quality of the optical signal for testing following the control signal for determining the upper limit value, and every time the output values of the variable attenuators 21a and 21b are increased, measures the quality of the optical signal for testing. The configuration of the first spectrum monitor 24 is the same as the configuration of the second spectrum monitor 25, including a variable wavelength filter 241, a photodetector 242, and an analog-digital converter 243. A measurement result of the first spectrum monitor 24 is input into the control value calculation circuit 311.

The control value calculation circuit 311 calculates the amount of spectral surplus based on a measured value of the first spectrum monitor 24 and a target value stored in the target value memory 261.

The output control circuit 321 determines the amount of spectral surplus when the measured value of the BER written in the memory for measured values 262 reaches the threshold Q as the permissible limit, as the upper limit value of the amount of spectral surplus. The upper limit value is stored in the memory for measured values 262 from the control value calculation circuit 311.

Although the control value calculation circuit 311 and the output control circuit 321 are implemented as discrete circuits in FIG. 19, functions of the control value calculation circuit 311 and the output control circuit 321 may be implemented by a single microprocessor. Alternatively, they may be implemented as a single integrated circuit together with the target value memory 261 and the memory for measured values 262.

Figure 20:
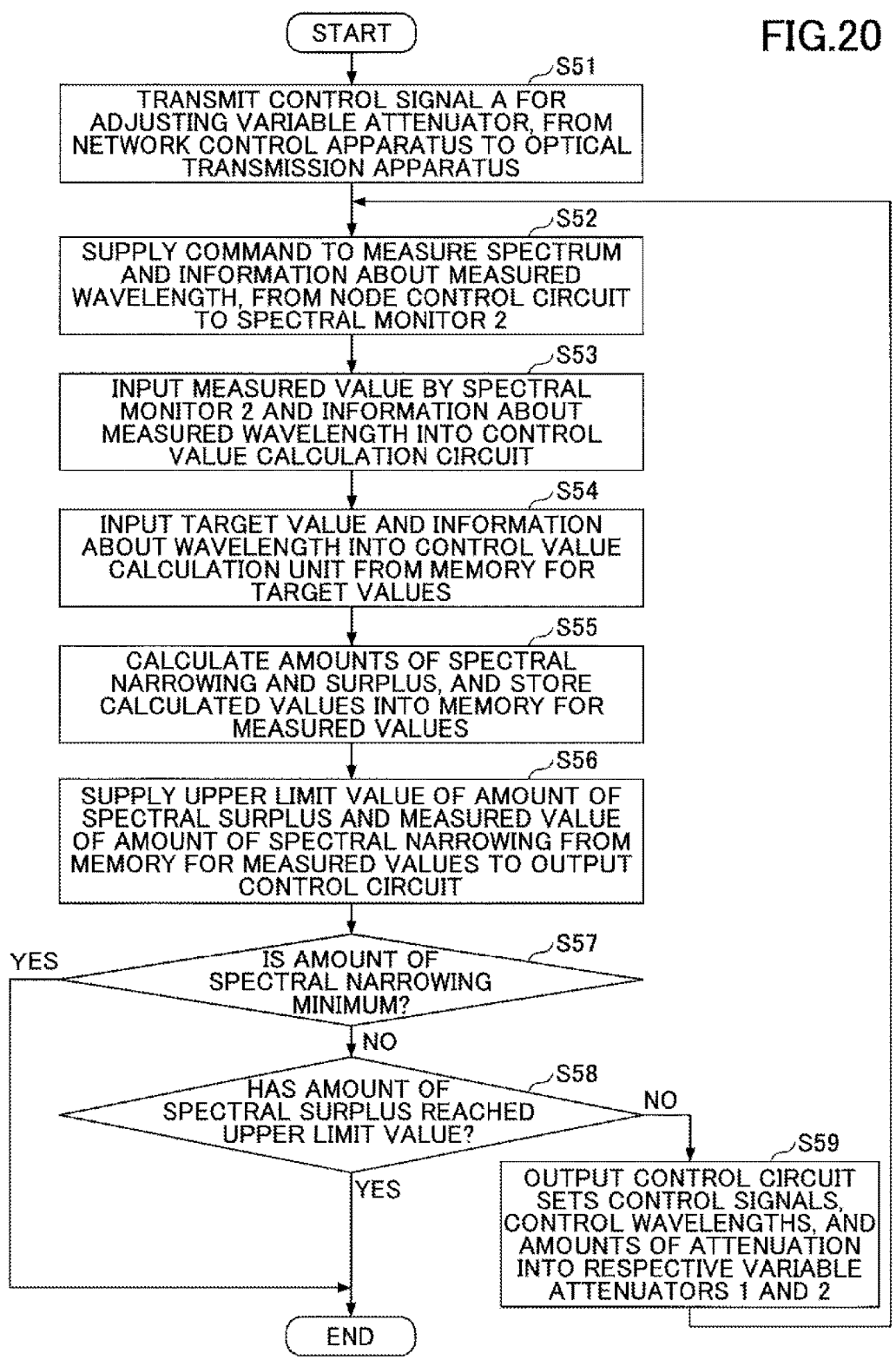
FIG. 20 is a flowchart illustrating a method of controlling output in the optical transmission apparatus in FIG. 19.

FIG. 20 is a flowchart of the output control in the optical transmission apparatus 2C in FIG. 19. The network control apparatus 3 transmits a control signal A commanding to adjust the output value of an optical signal to the optical transmission apparatus 2C (Step S51). In response to receiving the control signal A, the node control circuit 331 supplies a command to measure the spectrum and information about wavelengths to be measured to the second spectrum monitor 25 (Step S52). The measurement result by the spectrum monitor 25 is input into the control value calculation circuit 311 along with the measured wavelength (monitored wavelength) (Step S53).

The target value for each wavelength signal is input into the control value calculation circuit 311 from the target value memory 261 (Step S54). Based on the target value and the measured value by the spectrum monitor 25, the control value calculation circuit 311 calculates the amount of spectral narrowing and the amount of surplus from Formulas (1) to (4). The calculated value is stored in the memory for measured values (Step S55).

The output control circuit 321 reads out the upper limit value of the amount of spectral surplus and the amount of spectral narrowing from the memory for measured values 262. Thus, the upper limit value of the amount of spectral surplus and the amount of spectral narrowing are supplied to the output control circuit 321 from the memory for measured values 262 (Step S56).

The output control circuit 321 determines whether the amount of spectral narrowing is minimum (Step S57), and if minimum (YES at Step S57), maintains the output value or the amount of attenuation used at that moment, and ends the process. If the amount of spectral narrowing is not minimum (NO at Step S57), the output control circuit 321 determines whether the amount of spectral surplus has reached the upper limit value (Step S58). If the amount of spectral surplus has reached the upper limit value (YES at Step S58), the output control circuit 321 determines that the amount of spectral surplus has reached the permissible limit during the process of minimizing the spectral narrowing, and ends the process. In this case, the output value or the amount of attenuation when the process ends is used.

If the amount of spectral surplus has not reached the upper limit value (NO at Step S58), the output value can be increased further. Therefore, the output control circuit 321 transmits a control signal commanding to increase the output values to the variable attenuators 21a and 21b (or to decrease the amounts of attenuation) along with a control band (Step S59). After that, the process goes back to Step S52, repeats Steps S52 to S58 with the updated output values or the amounts of attenuation, and when the amount of spectral surplus reaches the upper limit, the process ends.

If the output of the variable attenuator has been raised to the upper limit of the amount of spectral surplus, it is unlikely that the spectral narrowing is still generated. However, even if the spectral narrowing is still generated, influence on the transmission quality is checked maximally. Thus, transmission quality of an optical signal output to the optical transmission line 4 can be maintained favorably.

The flow for determining the upper limit value of spectral surplus is substantially the same as the process flow in FIG. 18 except that the node control circuit 331 receives a control signal from the network control apparatus 3, and the illustration is omitted.

A process for minimizing spectral narrowing based on a control signal from the network control apparatus 3 is applicable to the optical transmission system 1A that includes the optical node 200 not having a spectral monitor 25 as in the second embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus, comprising:
   a variable attenuator configured to adjust output intensity of each wavelength signal included in a multiplexed optical signal having been input;
   a monitor configured to measure an output spectrum of the variable attenuator;
   a calculation unit configured to calculate an amount of spectral narrowing and an amount of spectral surplus, based on a measured value by the monitor, and a target value set in advance; and
   a control unit configured to control an amount of attenuation of the variable attenuator, based on the amount of spectral narrowing and the amount of spectral surplus.

2. The optical transmission apparatus as claimed in claim 1, wherein the control unit controls the amount of attenuation of the variable attenuator so that the amount of spectral narrowing becomes minimum within a predetermined range of the amount of spectral surplus, for each variable attenuation band as a unit of controlling the variable attenuator.

3. The optical transmission apparatus as claimed in claim 1, wherein the control unit controls the amount of attenuation of the variable attenuator so that in a case where two adjacent components of the wavelength signals are included in a variable attenuation band as a unit of controlling the variable attenuator, spectral surplus within a predetermined range is generated for each of the two adjacent components of the wavelength signals.

4. The optical transmission apparatus as claimed in claim 1, further comprising:
   a memory configured to store an upper limit value of the amount of spectral surplus,
   wherein the control unit controls the amount of attenuation of the variable attenuator so that the amount of spectral narrowing becomes minimum within a range in which the amount of spectral surplus does not exceed the upper limit value.

5. The optical transmission apparatus as claimed in claim 4, wherein the control unit controls the amount of attenuation of the variable attenuator so that in a case where the calculated amount of spectral surplus exceeds the upper limit value, the amount of spectral surplus becomes the upper limit value.

6. The optical transmission apparatus as claimed in claim 4, wherein the upper limit value is a value depending on reception quality at a node to which the multiplexed optical signal is output.

7. The optical transmission apparatus as claimed in claim 4, further comprising:
   a transmitter configured to transmit a test signal;
   a receiver configured to receive the test signal from the transmitter in the optical transmission apparatus; and
   a determination unit configured to determine the upper limit value based on signal quality of the test signal measured by the receiver and the amount of spectral surplus calculated by the calculation unit.

8. The optical transmission apparatus as claimed in claim 4, further comprising:
   a receiver configured to receive a test signal from another optical transmission apparatus; and
   a determination unit configured to determine the upper limit value based on signal quality of the test signal measured by the receiver and the amount of spectral surplus calculated by the calculation unit.

9. An optical transmission system, comprising:
the optical transmission apparatus as claimed in claim 1; and
a network control apparatus configured to control one or more of the optical transmission apparatuses.

10. An optical transmission system, comprising:
one or more optical transmission apparatuses; and
a network control apparatus configured to control the optical transmission apparatuses,
wherein the optical transmission apparatus includes
a variable attenuator configured to adjust output intensity of each wavelength signal included in a multiplexed optical signal having been input;
a monitor configured to measure an output spectrum of the variable attenuator, based on a control signal from the network control apparatus;
a calculation unit configured to calculate an amount of spectral narrowing and an amount of spectral surplus, based on a measurement result by the monitor, and a target value set in advance; and
a control unit configured to control an amount of attenuation of the variable attenuator based on the amount of spectral narrowing and the amount of spectral surplus.

11. The optical transmission system as claimed in claim 10, further comprising:
an optical node not having a spectral monitor and placed at a succeeding stage of the optical transmission apparatus; and
an optical transmission line connecting the optical transmission apparatus with the optical node,
wherein the optical transmission apparatus outputs the multiplexed optical signal whose output intensity is controlled so that the amount of spectral surplus becomes a permissible upper limit value, and the amount of spectral narrowing becomes minimum, to the optical transmission line.

12. The optical transmission system as claimed in claim 11, further comprising:
a second optical transmission apparatus placed at a succeeding stage of the optical node,
wherein the second optical transmission apparatus controls the output intensity of the multiplexed optical signal so that the amount of spectral surplus becomes the permissible upper limit value in a case where the amount of spectral surplus calculated by the second optical transmission apparatus exceeds the upper limit value.

13. A method of controlling output of an optical signal, the method comprising:
measuring a spectrum of a multiplexed optical signal passing through a variable attenuator in an optical transmission apparatus;
calculating an amount of spectral narrowing and an amount of spectral surplus based on a measured value of the spectrum and a target value set in advance in the optical transmission apparatus; and
adjusting an amount of attenuation of the variable attenuator based on the amount of spectral narrowing and the amount of spectral surplus in the optical transmission apparatus.

14. The method of controlling output of the optical signal as claimed in claim 13, wherein the adjusting controls the amount of attenuation of the variable attenuator so that the amount of spectral narrowing becomes minimum within a predetermined range of the amount of spectral surplus, for each variable attenuation band as a unit of controlling the variable attenuator.

15. The method of controlling output of the optical signal as claimed in claim 13, wherein the adjusting controls the amount of attenuation of the variable attenuator so that in a case where two adjacent components of the wavelength signals are included in a variable attenuation band as a unit of controlling the variable attenuator, spectral surplus within a predetermined range is generated for each of the two adjacent components of the wavelength signals.

16. The method of controlling output of the optical signal as claimed in claim 13, the method further comprising:
storing the upper limit value of the amount of spectral surplus in a memory,
wherein the adjusting controls the amount of attenuation of the variable attenuator so that the amount of spectral narrowing becomes minimum within a range in which the amount of spectral surplus does not exceed the upper limit value.

17. The method of controlling output of the optical signal as claimed in claim 16, wherein the adjusting controls the amount of attenuation of the variable attenuator so that in a case where the calculated amount of spectral surplus exceeds the upper limit value, the amount of spectral surplus becomes the upper limit value.

18. The method of controlling output of the optical signal as claimed in claim 16, the method further comprising:
determining the upper limit value depending on reception quality at a node to which the multiplexed optical signal is output.

19. The method of controlling output of the optical signal as claimed in claim 16, the method further comprising:
transmitting a test signal from a transmitter in the optical transmission apparatus, to a receiver in the optical transmission apparatus; and
determining the upper limit value based on signal quality of the test signal measured by the receiver and the amount of spectral surplus calculated by the calculating.

20. The method of controlling output of the optical signal as claimed in claim 16, the method further comprising:
receiving a test signal from another optical transmission apparatus by a receiver in the optical transmission apparatus; and
determining the upper limit value based on signal quality of the test signal measured by the receiver and the amount of spectral surplus calculated by the calculating.

* * * * *